(12) United States Patent
Abraham et al.

(10) Patent No.: US 9,794,796 B2
(45) Date of Patent: Oct. 17, 2017

(54) SYSTEMS AND METHODS FOR SIMPLIFIED STORE AND FORWARD RELAYS

(71) Applicant: Qualcomm Incorporated, San Diego, CA (US)

(72) Inventors: Santosh Paul Abraham, San Diego, CA (US); Alfred Asterjadhi, Chicago, IL (US); Simone Merlin, San Diego, CA (US); Maarten Menzo Wentink, Naarden (NL)

(73) Assignee: QUALCOMM, Incorporation, San Diego, CA (US)

( * ) Notice: Subject to any disclaimer, the term of this patent is extended or adjusted under 35 U.S.C. 154(b) by 452 days.

(21) Appl. No.: 13/837,597

(22) Filed: Mar. 15, 2013

(65) Prior Publication Data

US 2013/0336196 A1   Dec. 19, 2013

Related U.S. Application Data

(60) Provisional application No. 61/659,395, filed on Jun. 13, 2012.

(51) Int. Cl.
*H04J 3/08* (2006.01)
*H04W 16/26* (2009.01)
(Continued)

(52) U.S. Cl.
CPC ............ *H04W 16/26* (2013.01); *H04B 7/155* (2013.01); *H04B 7/2606* (2013.01);
(Continued)

(58) Field of Classification Search
CPC .................................................... H04W 16/26
(Continued)

(56) References Cited

U.S. PATENT DOCUMENTS 7,336,923 B2    2/2008  Yadav
7,362,722 B2    4/2008  Otsuka
(Continued)

FOREIGN PATENT DOCUMENTS

EP    1126636 A2    8/2001
EP    1341346 A2    9/2003
(Continued)

OTHER PUBLICATIONS

Kumar, et al., "Technical Issues in IEEE 802.16j Mobile Multi-Hop Relay (MMR) Networks", European Journal of Scientific Research, 2011, pp. 507-533.
(Continued)

*Primary Examiner* — Ricky Ngo
*Assistant Examiner* — Wei-Po Kao
(74) *Attorney, Agent, or Firm* — Eric Ho

(57) ABSTRACT

Systems, methods, and devices for communicating data in a wireless communications network are described herein. In some aspects, a relay provides relay services for network communication between a first station and a second station. In one aspect, the relay may receive data packets sent to the second station by the first station, and retransmit the data packets if it determines that the second station has not acknowledged the data packet. In one other aspect, the first station may be configured to transmit a relay-able acknowledgement that includes a sequence number identifying data being acknowledged. The relay may be configured to receive a transmission of a first relay-able acknowledgement by the first station and retransmit a second relay-able acknowledgement if it determines the second station did not receive the first relay-able acknowledgement sent by the first station. In some aspects, the second station is an access point.

55 Claims, 25 Drawing Sheets

(51) Int. Cl.
*H04B 7/155* (2006.01)
*H04B 7/26* (2006.01)
*H04L 1/16* (2006.01)
*H04L 1/18* (2006.01)
*H04L 1/00* (2006.01)

(52) U.S. Cl.
CPC .......... *H04L 1/1628* (2013.01); *H04L 1/1867* (2013.01); *H04L 2001/0097* (2013.01)

(58) Field of Classification Search
USPC .................................................. 370/310–350
See application file for complete search history.

(56) References Cited

U.S. PATENT DOCUMENTS

| | | | |
|---|---|---|---|
| 8,131,209 B1 | 3/2012 | Chen et al. | |
| 8,201,044 B2 | 6/2012 | Chang et al. | |
| 8,228,836 B2 | 7/2012 | Erkip et al. | |
| 8,243,623 B2 | 8/2012 | Gong et al. | |
| 2003/0208616 A1 | 11/2003 | Laing et al. | |
| 2004/0223478 A1* | 11/2004 | Fischer ................. H04L 1/1607 370/338 |
| 2005/0195753 A1 | 9/2005 | Chaskar et al. | |
| 2006/0084377 A1 | 4/2006 | Lee et al. | |
| 2006/0146752 A1 | 7/2006 | Jang et al. | |
| 2007/0072600 A1 | 3/2007 | Cho et al. | |
| 2007/0081479 A1 | 4/2007 | Kang et al. | |
| 2007/0127367 A1 | 6/2007 | Ogasahara et al. | |
| 2007/0189283 A1 | 8/2007 | Agarwal et al. | |
| 2007/0248065 A1 | 10/2007 | Banerjea et al. | |
| 2007/0253395 A1 | 11/2007 | Graves et al. | |
| 2008/0013459 A1 | 1/2008 | Do et al. | |
| 2008/0057973 A1 | 3/2008 | Park | |
| 2008/0137581 A1 | 6/2008 | Doppler et al. | |
| 2008/0162516 A1 | 7/2008 | Shinomiya | |
| 2008/0188177 A1 | 8/2008 | Tan et al. | |
| 2008/0205385 A1 | 8/2008 | Zeng et al. | |
| 2008/0221988 A1 | 9/2008 | Bappu et al. | |
| 2008/0232256 A1 | 9/2008 | Douglas et al. | |
| 2008/0247399 A1 | 10/2008 | Hazard | |
| 2008/0310348 A1 | 12/2008 | Nandagopalan et al. | |
| 2008/0316954 A1 | 12/2008 | Zheng | |
| 2009/0028086 A1 | 1/2009 | Tay et al. | |
| 2009/0052327 A1 | 2/2009 | Larsson et al. | |
| 2009/0073945 A1 | 3/2009 | Seok | |
| 2009/0190515 A1 | 7/2009 | Finn et al. | |
| 2009/0257386 A1* | 10/2009 | Achir ................. H04L 25/14 370/329 |
| 2009/0296578 A1 | 12/2009 | Bernard et al. | |
| 2009/0304008 A1 | 12/2009 | Kono et al. | |
| 2010/0027494 A1 | 2/2010 | Kwon et al. | |
| 2010/0035541 A1 | 2/2010 | Kim et al. | |
| 2010/0046417 A1 | 2/2010 | Tamura | |
| 2010/0046420 A1 | 2/2010 | Hart et al. | |
| 2010/0061272 A1 | 3/2010 | Veillette | |
| 2010/0142433 A1 | 6/2010 | Womack et al. | |
| 2010/0157821 A1 | 6/2010 | Morris | |
| 2010/0157845 A1 | 6/2010 | Womack et al. | |
| 2010/0167743 A1 | 7/2010 | Palanki et al. | |
| 2010/0177807 A1 | 7/2010 | Zhang | |
| 2010/0189044 A1 | 7/2010 | Roy et al. | |
| 2010/0191839 A1 | 7/2010 | Gandhewar et al. | |
| 2010/0195665 A1* | 8/2010 | Jackson ................. 370/464 |
| 2010/0246480 A1 | 9/2010 | Aggarwal et al. | |
| 2010/0260096 A1 | 10/2010 | Ulupinar et al. | |
| 2011/0002337 A1 | 1/2011 | Akahane et al. | |
| 2011/0007692 A1 | 1/2011 | Seok | |
| 2011/0032864 A1 | 2/2011 | Lee et al. | |
| 2011/0032924 A1 | 2/2011 | Lee et al. | |
| 2011/0038480 A1 | 2/2011 | Lin | |
| 2011/0051629 A1 | 3/2011 | Chun et al. | |
| 2011/0058551 A1 | 3/2011 | Fernandez Gutierrez | |
| 2011/0149804 A1 | 6/2011 | Denteneer et al. | |
| 2011/0228697 A1 | 9/2011 | Yano et al. | |
| 2011/0228755 A1 | 9/2011 | Seok | |
| 2011/0243062 A1 | 10/2011 | Wang et al. | |
| 2011/0244851 A1 | 10/2011 | Gunnarsson et al. | |
| 2011/0249609 A1 | 10/2011 | Brusilovsky et al. | |
| 2011/0292862 A1 | 12/2011 | Shimizu | |
| 2011/0305190 A1 | 12/2011 | Seki | |
| 2011/0305339 A1 | 12/2011 | Norrman et al. | |
| 2011/0310912 A1 | 12/2011 | Cai et al. | |
| 2012/0002587 A1* | 1/2012 | Kito ................. H04B 7/155 370/315 |
| 2012/0002589 A1 | 1/2012 | Saifullah et al. | |
| 2012/0008596 A1 | 1/2012 | Jung et al. | |
| 2012/0015659 A1 | 1/2012 | Kalyani et al. | |
| 2012/0051240 A1 | 3/2012 | Dwivedi et al. | |
| 2012/0051346 A1 | 3/2012 | Herbert et al. | |
| 2012/0135677 A1 | 5/2012 | Hsu et al. | |
| 2012/0155301 A1 | 6/2012 | Miyazaki et al. | |
| 2012/0182878 A1 | 7/2012 | Qian | |
| 2012/0182926 A1* | 7/2012 | Yu et al. ................. 370/315 |
| 2012/0188931 A1 | 7/2012 | Lee et al. | |
| 2012/0208545 A1 | 8/2012 | Yang et al. | |
| 2012/0218977 A1 | 8/2012 | Seok | |
| 2012/0233331 A1 | 9/2012 | Voccio et al. | |
| 2012/0243483 A1 | 9/2012 | Ahmadi et al. | |
| 2012/0258688 A1 | 10/2012 | Mizukoshi | |
| 2012/0307685 A1 | 12/2012 | Kim et al. | |
| 2012/0314621 A1 | 12/2012 | Finn et al. | |
| 2012/0317619 A1 | 12/2012 | Dattagupta et al. | |
| 2013/0094429 A1 | 4/2013 | Seok | |
| 2013/0114491 A1 | 5/2013 | Kim et al. | |
| 2013/0188542 A1 | 7/2013 | Merlin et al. | |
| 2013/0235760 A1 | 9/2013 | Merlin et al. | |
| 2013/0235788 A1 | 9/2013 | Abraham et al. | |
| 2013/0235789 A1 | 9/2013 | Abraham et al. | |
| 2013/0235790 A1 | 9/2013 | Abraham et al. | |
| 2013/0235791 A1 | 9/2013 | Abraham et al. | |
| 2013/0235792 A1 | 9/2013 | Abraham et al. | |
| 2014/0003426 A1 | 1/2014 | Sankar et al. | |
| 2014/0064184 A1 | 3/2014 | Cherian et al. | |
| 2014/0064196 A1 | 3/2014 | Abraham et al. | |
| 2014/0086215 A1 | 3/2014 | Duo et al. | |

FOREIGN PATENT DOCUMENTS

| | | |
|---|---|---|
| EP | 1732265 A1 | 12/2006 |
| EP | 1924009 A1 | 5/2008 |
| TW | I233731 B | 6/2005 |
| WO | 03096554 A2 | 11/2003 |
| WO | 2004032426 A1 | 4/2004 |
| WO | 2007046630 A2 | 4/2007 |
| WO | 2007063521 A2 | 6/2007 |
| WO | 2008038247 A2 | 4/2008 |
| WO | 2008045632 A1 | 4/2008 |
| WO | 2009106616 A1 | 9/2009 |
| WO | 2010143894 A2 | 12/2010 |

OTHER PUBLICATIONS

Aust S., et al., "IEEE 802.11ah: Advantages in standards and further challenges for sub 1 GHz Wi-Fi", Communications (ICC), 2012 IEEE International Conference on, IEEE, Jun. 10, 2012 (Jun. 10, 2012), pp. 6885-6889, XP032274723, DOI: 10.1109/ICC.2012. 6364903 ISBN: 978-1-4577-2052-9 the whole document.

He X., et al., "Cooperative RTS/CTS MAC with relay selection in distributed wireless networks", Ultra Modern Telecommunications &Workshops, 2009, ICUMT '09, International Conference on, IEEE, Piscataway, NJ, USA, Oct. 12, 2009 (Oct. 12, 2009), pp. 1-8, XP031574263, ISBN: 978-1-4244-3942-3 the whole document.

International Search Report and Written Opinion—PCT/US2013/ 040741—ISA/EPO—Aug. 13, 2013.

Kim D.W., et al., "A Robust and Cooperative MAC Protocol for IEEE 802.11a Wireless Networks", Wireless Personal Communications, Kluwer Academic Publishers, DO, vol. 67, No. 3, Sep. 23, 2011 (Sep. 23, 2011), pp. 689-705, XP035131529, ISSN: 1572-834X, DOI: 10.1007/S11277-011-0405-5 p. 696-p. 697.

Lim W.S., et al., "PR-MAC: A practical approach for exploiting relay transmissions in multi-rate WLANs", IEEE Transactions on

(56) References Cited

OTHER PUBLICATIONS

Wireless Communications, IEEE Service Center, Piscataway, NJ, US, vol. 9, No. 1, Jan. 1, 2010 (Jan. 1, 2010), pp. 66-71, XP011299450, ISSN: 1536-1276 the whole document.

Wei, H. and Gitlin, R. "WWANIWLAN Two-Hop-Relay Architecture for Capactiy Enhancement" WCNC 2004 I IEEE Communications Society. 2004. pp. 225-230.

Zhu H., et al.,"Gamma DCF: A Relay-enabled Medium Access Control Protocol for Wireless Ad Hoc Networks", Mobile Computing, IEEE Transactions on Sep. 2006, U.S.A., IEEE, Sep. 2006, vol. 5, Issue:9, pp. 1201-1214.

3GPP TSG-RAN1 #58; Considerations on using Type II relay for UL transmission, Fujitsu, 3GPP, R1-093159, pp. 1-3, Shenzhen, China, Aug. 24-28, 2009.

Bahr M., "Proposed Routing for IEEE 802.11s WLAN Mesh Networks," WICON '06 The 2nd Annual International Wireless Internet Conference, Aug. 2-5, 2006, 10 pages.

Cerutti I., et al., "Delay Model of Single-Relay Cooperative ARQ Protocols in Slotted Radio Networks with Non-Instantaneous Feedback and Poisson Frame Arrivals," 2007, IEEE, pp. 2276-2280.

D-Link Forum BETA, Bridge Mode vs Relay vs Acess Point (AP) / Routers vs Dedicated Acess Points (AP), URL: <http://forums.dlink.com/index.php?topic=50738.0>, Retrieved on Jan. 22, 2013, 2 Pages.

Jain, "Wireless Mesh and Multi-Hop Relay Networks", Washington University, St. Louis, 2010, 24pgs.

Lee M.J., et al., "Emerging Standards for Wireless Mesh Technology," Wireless Mesh Networking, IEEE Wireless Communications, IEEE, Apr. 2006, pp. 56-63.

SA3: "Living Document on Key Security Issues of Relay Node Architectures", 3GPP Draft; S3-101106-Clean, 3rd Generation Partnership Project (3GPP), Mobile Competence Centre ; 650, Route Des Lucioles ; F-06921 Sophia-Antipolis Cedex ; France, vol. SA WG3, no. Riga; Sep. 27, 2010, Oct. 7, 2010 (Oct. 7, 2010), XP050459845, [retrieved on Oct. 7, 2010].

Wei H-Y et al., "Two-Hop-Relay Architecture for Nextgeneration WWAN/WLAN Integration", IEEE Wireless Communications, IEEE Service Center, Piscataway, NJ, US, vol. 11, No. 2, Apr. 1, 2004 (Apr. 1, 2004), pp. 24-30, XP001196396, ISSN: 1536-1284, DOI: 10.1109/MWC.2004.1295734.

\* cited by examiner

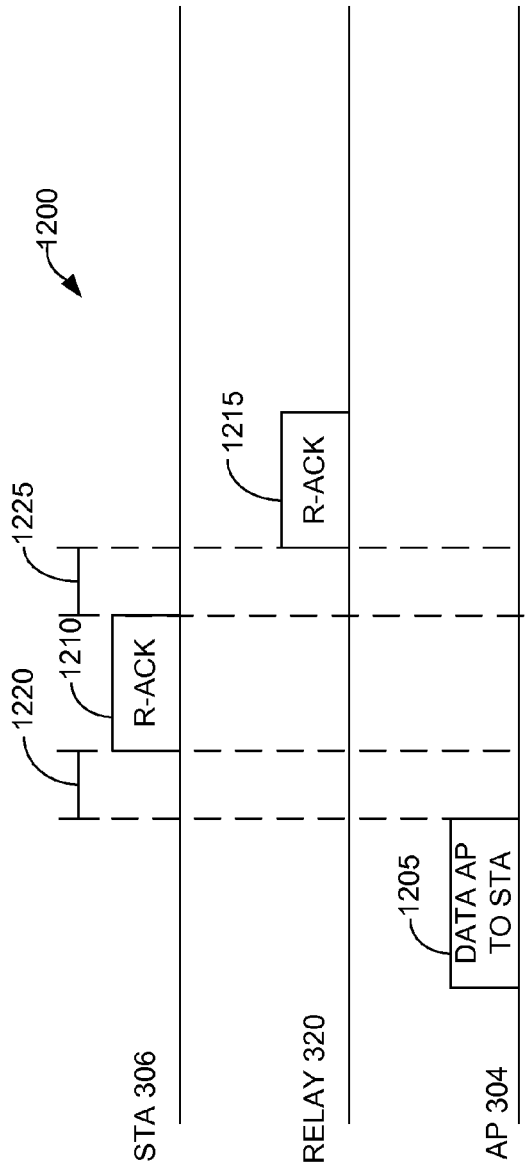
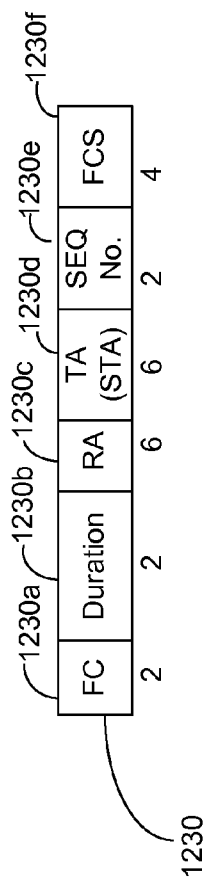
FIG. 12A
FIG. 12B

SYSTEMS AND METHODS FOR SIMPLIFIED STORE AND FORWARD RELAYS

CROSS REFERENCE TO RELATED APPLICATIONS

This application claims the benefit of U.S. Provisional Application No. 61/659,395 filed Jun. 13, 2012, and entitled "SYSTEMS AND METHODS FOR SIMPLIFIED STORE AND FORWARD RELAYS," which is assigned to the assignee hereof, and which is considered part of and incorporated by reference in this application in its entirety.

BACKGROUND

Field

The present application relates generally to wireless communications, and more specifically to systems, methods, and devices for using a relay in a wireless communication network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In some aspects, the devices in the wireless network may have a poor connection and/or may not be able to communicate with each other. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One innovative aspect includes a method for communicating data in a wireless communications network. The method includes transmitting a request-to-send message to a relay, receiving a clear-to-send message from the relay, transmitting data identified by a first sequence number to a station based, at least in part, on receiving the clear-to-send message from the relay.

Another innovative aspect is an apparatus for communicating data in a wireless communications network. The apparatus includes a transmitter configured to transmit a request-to-send to a relay, a receiver configured to receive a clear-to-send from the relay. The transmitter is further configured to transmit data identified by a first sequence number to a station based, at least in part, on receiving the clear-to-send message from the relay.

Another innovative aspect is an apparatus for communicating data in a wireless communications network. The apparatus includes means for transmitting a request-to-send to a relay, means for receiving a clear-to-send from the relay, and means for transmitting data identified by a first sequence number to a station based, at least in part, on receiving the from the relay.

Another innovative aspect disclosed includes a non-transitory computer readable medium comprising instructions that when executed cause an apparatus to transmit a request-to-send message to a relay, receive a clear-to-send message from the relay, and transmit data identified by a first sequence number to a station based, at least in part, on receiving the clear-to-send message from the relay.

Another innovative aspect is a method for communicating data in a wireless communications network. The method includes transmitting a request-to-send message to a relay, receiving a clear-to-send message from the relay, and transmitting data to an access point based at least in part, on the clear-to-send message received from the relay.

Another innovative aspect is an apparatus for communicating data in a wireless communications network. The apparatus includes a transmitter configured to transmit a request-to-send message to a relay, a receiver configured to receive a clear-to-send message from the relay. The transmitter is further configured to transmit data to an access point based at least in part, on the clear-to-send received from the relay.

Another innovative aspect includes an apparatus for communicating data in a wireless communications network. The apparatus includes means for transmitting a request-to-send message to a relay, means for receiving a clear-to-send message from the relay, and means for transmitting data to an access point based at least in part, on the clear-to-send message received from the relay.

Another innovative aspect includes a non-transitory computer readable medium comprising instructions that when executed cause an apparatus to transmit a request-to-send message to a relay, receive a clear-to-send message from the relay, and transmit data to an access point based at least in part, on the clear-to-send message received from the relay.

Another innovative aspect is a method for communicating data in a wireless communications network. The method includes receiving a data packet transmitted to an access point by a station, determining whether an acknowledgement has been transmitted by the access point during a time period following the receiving, and transmitting the data packet to the access point if no acknowledgement has been transmitted during the time period.

Another innovative aspect is an apparatus for communicating data in a wireless communications network. The apparatus includes a receiver configured to receive a data packet transmitted by a station to an access point, a processor configured to determine whether an acknowledgement has been transmitted by the access point during a time period following the receiving, and a transmitter configured to transmit the data packet to the access point if no acknowledgement has been transmitted during the time period.

Another innovative aspect is an apparatus for communicating data in a wireless communications network. The apparatus includes means for receiving a data packet transmitted by a station to an access point, means for determining whether an acknowledgement has been transmitted by the access point during a time period following the receiving, and means for transmitting the data packet to the access point if no acknowledgement has been transmitted.

Another innovative aspect disclosed is a non-transitory computer readable medium comprising instructions that when executed cause an apparatus to receive a data packet transmitted by a station to an access point, determine whether an acknowledgement has been transmitted by the access point during a time period following the receiving, and transmit the data packet to the access point if no acknowledgement has been transmitted during the time period.

Another innovative aspect disclosed includes a method for communicating data in a wireless communications network. The method includes receiving a data packet, wherein the data packet includes the first sequence number, and transmitting a relay-able acknowledgement wherein the relay-able acknowledgement includes a first sequence number.

Another innovative aspect is an apparatus for communicating data in a wireless communications network. The apparatus includes a receiver configured to receive a data packet. The data packet includes a first sequence number. The apparatus also includes a transmitter configured to transmit a relay-able acknowledgement. The relay-able acknowledgement includes the first sequence number.

Another innovative aspect includes an apparatus for communicating data in a wireless communications network. The apparatus includes means for receiving a data packet. The data packet includes the first sequence number. The apparatus also includes means for transmitting a relay-able acknowledgement including the first sequence number.

Another innovative aspect disclosed is a non-transitory computer readable medium comprising instructions that when executed cause an apparatus to receive a data packet, including a first sequence number, and transmit a relay-able acknowledgement including the first sequence number.

Another innovative aspect is a method for communicating data in a wireless communications network. The method includes receiving a relay-able acknowledgement message transmitted to an access point by a station. The relay-able acknowledgment includes a first sequence number. The method also includes transmitting the relay-able acknowledgement to the access point.

Another innovative aspect disclosed includes an apparatus for communicating data in a wireless communications network. The apparatus includes a receiver configured to receive a relay-able acknowledgement transmitted to the access point from the station. A sequence number in the relay-able acknowledgement includes a first sequence number. The apparatus also includes a transmitter configured to transmit the relay-able acknowledgement to the access point.

Another innovative aspect includes an apparatus for communicating data in a wireless communications network. The apparatus includes means for receiving a relay-able acknowledgement message transmitted to an access point by a station. The relay-able acknowledgment includes a first sequence number. The apparatus also includes means for transmitting the relay-able acknowledgement to the access point.

Another innovative aspect is a non-transitory computer readable medium comprising instructions that when executed cause an apparatus to receive a relay-able acknowledgement message transmitted to an access point by a station. The relay-able acknowledgment includes a first sequence number. Additional instructions cause the apparatus to transmit the relay-able acknowledgement to the access point.

Another innovative aspect includes a method for communicating data in a wireless communications network. The method includes transmitting data identified by a first sequence number, and receiving a first relay-able acknowledgement including the first sequence number.

Another innovative aspect includes an apparatus for communicating data in a wireless communications network. The apparatus includes a transmitter configured to transmit data to a station. The data is identified by a first sequence number. The apparatus also includes a receiver configured to receive a first relay-able acknowledgement including the first sequence number.

Another innovative aspect is an apparatus for communicating data in a wireless communications network. The apparatus includes means for transmitting data to a station. The data is identified by a first sequence number. The apparatus also includes means for receiving a first relay-able acknowledgement including the first sequence number.

Another innovative aspect disclosed is a non-transitory computer readable medium comprising instructions that when executed cause an apparatus to transmit data to a station, wherein the data is identified by a first sequence number, and receive a first relay-able acknowledgement including the first sequence number.

Another innovative aspect disclosed is a method for relaying data in an 802.11 wireless communications network between a first station and a second station using a relay. The method includes transmitting, by the first station, a request-to-send message to a relay, receiving, by the first station, a clear-to-send message from the relay, transmitting, by the first station, data identified by a first sequence number to the second station based, at least in part, on receiving the clear-to-send message from the relay, and receiving, by the first station, a first relay-able acknowledgement message from either the second station or the relay, wherein the first relay-able acknowledgement message includes the first sequence number.

Another aspect disclosed is an apparatus for relaying data in an 802.11 wireless communications network between a first station and a second station using a relay. The apparatus includes a transmitter configured to transmit a request-to-send to the relay, a receiver configured to receive a clear-to-send from the relay, a transmitter configured to transmit data identified by a first sequence number to a first station based, at least in part, on receiving the clear-to-send message from the relay, and a receiver configured to receive a first relay-able acknowledgement message from either the first station or the relay, wherein the first relay-able acknowledgement message includes the first sequence number.

Another aspect disclosed is an apparatus for relaying data in an 802.11 wireless communications network between a first station and a second station using a relay. The apparatus includes means for transmitting a request-to-send to a relay, means for receiving a clear-to-send from the relay, means for transmitting data identified by a first sequence number to the first station based, at least in part, on receiving the from the relay, and means for receiving a relay-able acknowledgement message from either the first station or the relay, wherein the relay-able acknowledgement message includes the first sequence number, wherein the relay-able acknowledgement message includes a transmitter's address.

Another aspect disclosed is a non-transitory computer readable medium comprising instructions that when executed cause an apparatus to perform a method of relaying data in an 802.11 wireless communications network between a first station and a second station using a relay. The method includes transmitting a request-to-send message to a relay, receiving a clear-to-send message from the relay, transmitting data identified by a first sequence number to the first station based, at least in part, on receiving the clear-to-send message from the relay, and receiving a relay-able acknowledgement message from either the first station or the relay, wherein the relay-able acknowledgement message includes the first sequence number.

Another aspect disclosed is a method for relaying data in an 802.11 wireless communications network between a first station and a second station using a relay. The method includes transmitting, by the first station, a request-to-send message to a relay, receiving, by the first station, a clear-to-send message from the relay, and transmitting, by the first station, data to the second station based at least in part, on the clear-to-send message received from the relay.

Another aspect disclosed is an apparatus for relaying data in an 802.11 wireless communications network between a first station and a second station using a relay. The apparatus includes a transmitter configured to transmit a request-to-send message to a relay, and a receiver configured to receive a clear-to-send message from the relay, wherein the transmitter is further configured to transmit data to the first station based at least in part, on the clear-to-send received from the relay.

Another aspect disclosed is an apparatus for relaying data in an 802.11 wireless communications network between a first station and a second station using a relay, the apparatus includes means for transmitting a request-to-send message to a relay, means for receiving a clear-to-send message from the relay, and means for transmitting data to a first station based at least in part, on the clear-to-send message received from the relay.

Another aspect disclosed is a non-transitory computer readable medium comprising instructions that when executed cause an apparatus to perform a method of relaying data in an 802.11 wireless communications network between a first station and a second station using a relay. The method includes transmitting a request-to-send message to a relay, receiving a clear-to-send message from the relay, and transmitting data to the first station based at least in part, on the clear-to-send message received from the relay.

Another aspect disclosed is a method for relaying data in an 802.11 wireless communications network between a first station and a second station using a relay. The method includes receiving, by the relay, a data packet transmitted to the first station by the second station, determining, by the relay, whether an acknowledgement has been transmitted by the first station during a time period following the receiving, and transmitting, by the relay, the data packet to the first station if no acknowledgement has been transmitted during the time period.

Another aspect disclosed is an apparatus for relaying data in an 802.11 wireless communications network between a first station and a second station using a relay. The apparatus includes a receiver configured to receive a data packet transmitted by the first station to a second station, a processor configured to determine whether an acknowledgement has been transmitted by the second station during a time period following the receiving, and a transmitter configured to transmit the data packet to the second station if no acknowledgement has been transmitted during the time period.

Another aspect disclosed is an apparatus for relaying data in an 802.11 wireless communications network between a first station and a second station using a relay. The apparatus includes means for receiving a data packet transmitted by the first station to the second station, means for determining whether an acknowledgement has been transmitted by the second station during a time period following the receiving, and means for transmitting the data packet to the second station if no acknowledgement has been transmitted.

Another aspect disclosed is a non-transitory computer readable medium comprising instructions that when executed cause an apparatus to perform a method of relaying data in an 802.11 wireless communications network between a first station and a second station using a relay. The method includes receiving a data packet transmitted by the first station to the second station, determining whether an acknowledgement has been transmitted by the second station during a time period following the receiving, and transmitting the data packet to the second station if no acknowledgement has been transmitted during the time period.

Another aspect disclosed is a method for relaying data in an 802.11 wireless communications network between a first station and a second station using a relay. The method includes receiving, by the first station, a data packet, wherein the data packet includes a first sequence number, and transmitting, by the first station, a relay-able acknowledgement wherein the relay-able acknowledgement includes the first sequence number.

Another aspect disclosed is an apparatus for relaying data in an 802.11 wireless communications network between a first station and a second station using a relay. The apparatus includes a receiver configured to receive a data packet, wherein the data packet includes a first sequence number, and a transmitter configured to transmit a relay-able acknowledgement, wherein the relay-able acknowledgement includes the first sequence number.

Another aspect disclosed is an apparatus for relaying data in an 802.11 wireless communications network between a first station and a second station using a relay. The apparatus includes means for receiving a data packet, wherein the data packet includes the first sequence number, and means for transmitting a relay-able acknowledgement wherein the relay-able acknowledgement includes the first sequence number.

Another aspect disclosed is a non-transitory computer readable medium comprising instructions that when executed cause an apparatus to perform a method of relaying data in an 802.11 wireless communications network between a first station and a second station using a relay. The method includes receiving a data packet, wherein the data packet includes a first sequence number, and transmitting a relay-able acknowledgement, wherein the relay-able acknowledgement includes the first sequence number.

Another aspect disclosed is a method for relaying data in an 802.11 wireless communications network between a first station and a second station using a relay. The method includes receiving, by the relay, a relay-able acknowledgement message transmitted to the first station by the second station, wherein the relay-able acknowledgment includes a first sequence number, and transmitting, by the relay, the relay-able acknowledgement to the first station.

Another aspect disclosed is an apparatus for relaying data in an 802.11 wireless communications network between a first station and a second station using a relay. The apparatus includes a receiver configured to receive a relay-able acknowledgement transmitted to the first station from the second station, wherein a sequence number in the relay-able acknowledgement includes a first sequence number; and a transmitter configured to transmit the relay-able acknowledgement to the first station.

Another aspect disclosed is an apparatus for relaying data in an 802.11 wireless communications network between a first station and a second station using a relay. The apparatus includes means for receiving a relay-able acknowledgement message transmitted to the first station by the second station, wherein the relay-able acknowledgment includes a first sequence number, and means for transmitting the relay-able acknowledgement to the first station.

Another aspect disclosed is a non-transitory computer readable medium comprising instructions that when executed cause an apparatus to perform a method of relaying data in an 802.11 wireless communications network between a first station and a second station using a relay. The method includes receiving a relay-able acknowledgement message transmitted to the first station by the second station, wherein the relay-able acknowledgment includes a first sequence number, and transmitting the relay-able acknowledgement to the first station.

Another aspect disclosed is a method for relaying data in an 802.11 wireless communications network between a first station and a second station using a relay. The method includes transmitting data identified by a first sequence number, and receiving a first relay-able acknowledgement including the first sequence number.

Another aspect disclosed is an apparatus for relaying data in an 802.11 wireless communications network between a first station and a second station using a relay. The apparatus includes a transmitter configured to transmit data to the first station, wherein the data is identified by a first sequence number, and a receiver configured to receive a first relay-able acknowledgement including the first sequence number.

Another aspect disclosed is an apparatus for relaying data in an 802.11 wireless communications network between a first station and a second station using a relay. The apparatus includes means for transmitting data to the first station, wherein the data is identified by a first sequence number, and means for receiving a first relay-able acknowledgement including the first sequence number.

Another aspect disclosed is a non-transitory computer readable medium comprising instructions that when executed cause an apparatus to perform a method of relaying data in an 802.11 wireless communications network between a first station and a second station using a relay. The method includes transmitting data to the first station, wherein the data is identified by a first sequence number, and receiving a first relay-able acknowledgement including the first sequence number.

BRIEF DESCRIPTION OF THE DRAWINGS

FIG. 12A illustrates a timing diagram 1200 of a system including the AP 304, the STA 306, and the relay 320, where the relay 320 is store and forward relay and all three devices communicate over a channel.

FIG. 12B illustrates one implementation of a packet format for a relay-able acknowledgement 1230.

DETAILED DESCRIPTION

Figure 1:
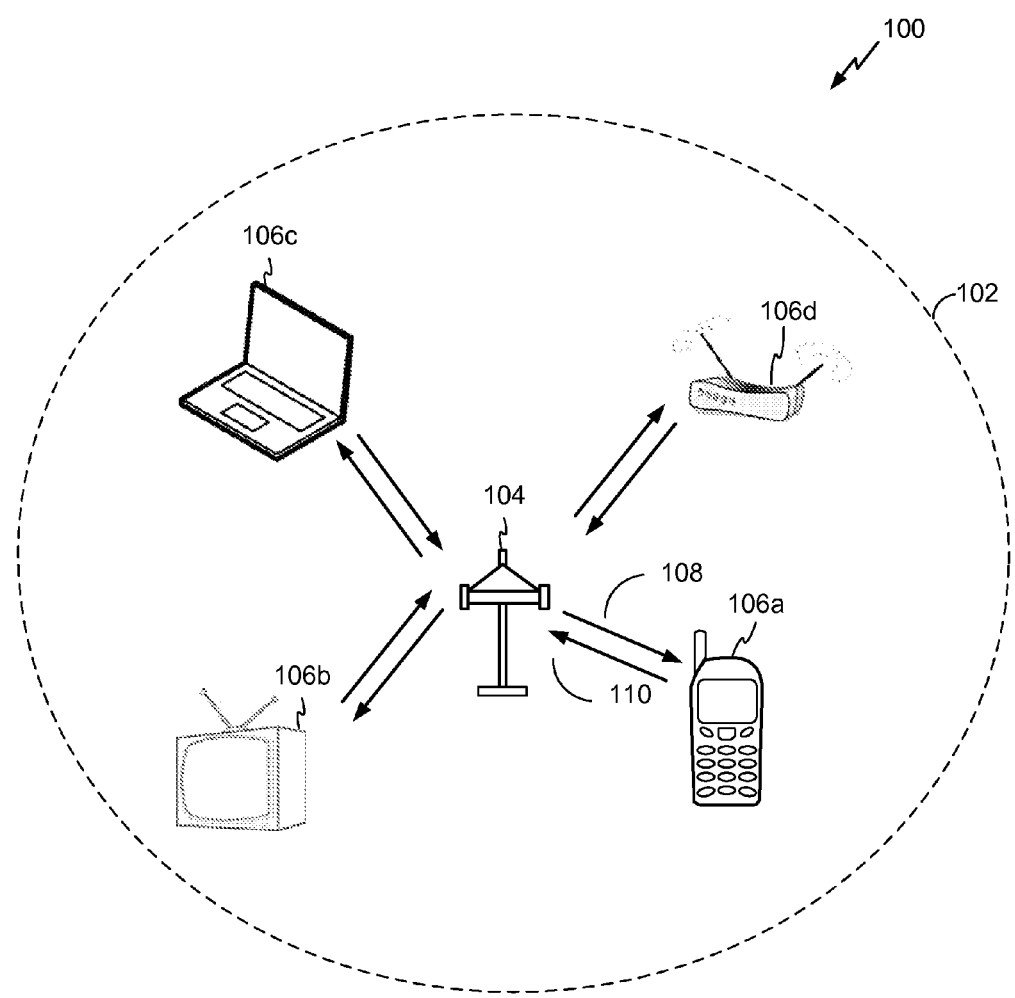
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
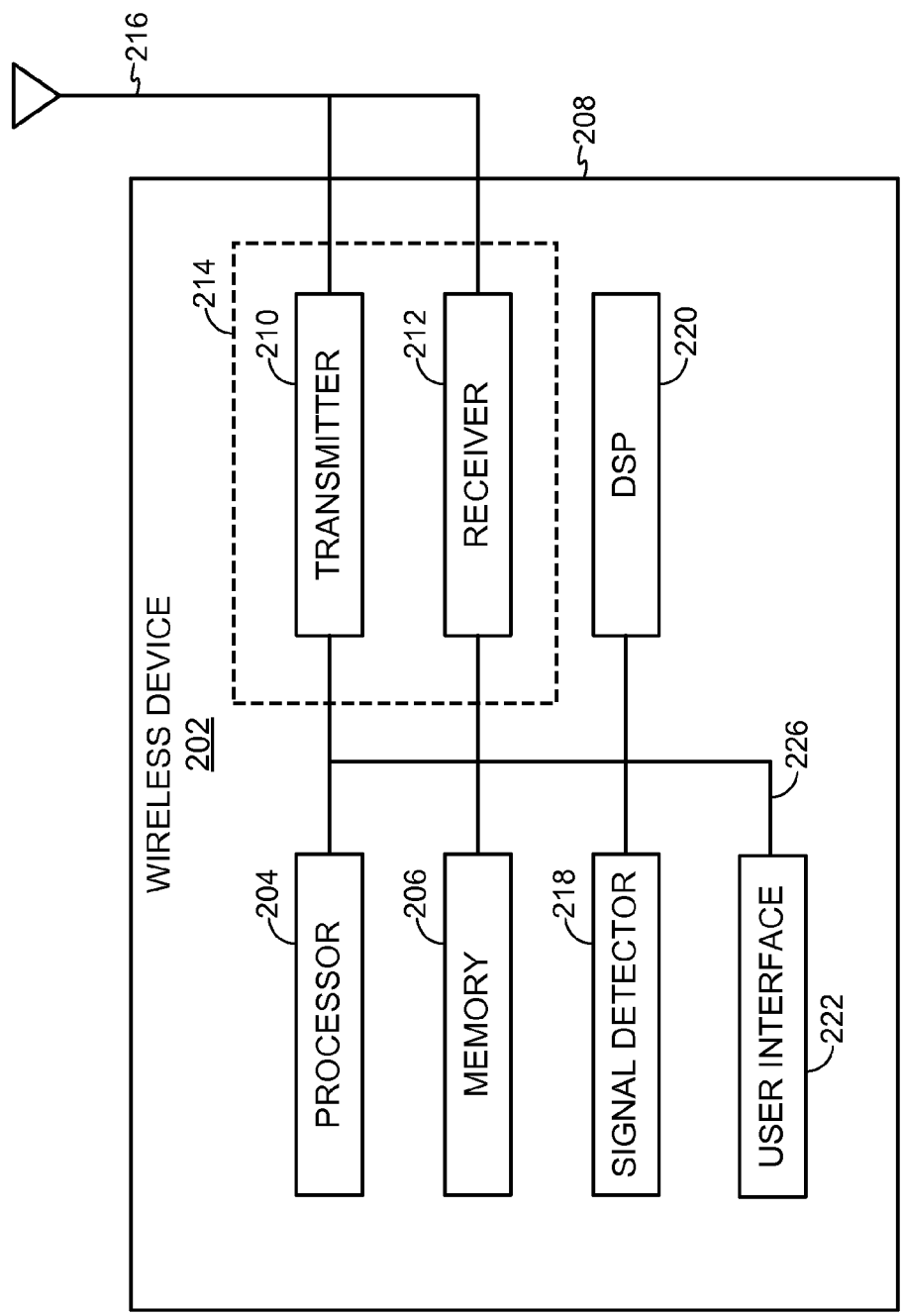
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106, or one of the relays 320 and/or 330.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104, a STA 106, a relay 320, and/or an association relay 330, and may be used to transmit and/or receive communications. That is, either AP 104, STA 106, relay 320, or association relay 330 may serve as transmitter or receiver devices. Certain aspects contemplate signal detector 218 being used by software running on memory 206 and processor 204 to detect the presence of a transmitter or receiver.

In some embodiments, AP 104 and STA 106 may not be able to communicate properly with each other. For example, AP 104 and STA 106 may be able to communicate with each other, but at a lower than desired data rate. In another example, AP 104 and/or STA 106 may be out of a transmit range of the other such that AP 104 and STA 106 cannot communicate with each other. Another device, such as a relay, may be utilized to form a bridge between the AP 104 and the STA 106 such that they can communicate properly with each other. For example, a store and forward relay may receive messages from the AP 104 and/or STA 106, determine an intended recipient of the messages, and forward the messages to the intended recipient. Store and forward relays may reduce median packet transmit times by half.

In some embodiments, the communication between AP 104 and STA 106 may be intermittent. Because an access point 104 may have a greater transmit power than a station, in some embodiments, the station may be able to receive data transmitted by the access point, but the access point may be unable to receive data transmitted by the station. In these embodiments, a store and forward relay may receive messages from the AP 104 and/or STA 106. In some embodiments, the store and forward relay may determine whether data packets transmitted by the STA to the AP were received successfully by the AP. When the store and forward relay determines the packets were not successfully received by the AP 104, the store and forward relay may retransmit the packets to the access point. In some embodiments, the relay may also provide arbitration services between the access point and the station. For example, the access point or the station may perform a request to send message/clear to send message exchange with the relay before transmitting data to the other.

FIG. 3A illustrates a wireless communications system 300 comprising an AP 304, a STA 306, and a relay 320. Note that while only one STA 306 and only one relay 320 are illustrated, the wireless communications system 300 may comprise any number of STAs and relays. In some embodiments, the AP 304 and the STA 306 can communicate with each other via the UL/DL transmissions 349/348. However, the AP 304 and the STA 306 may have a poor connection. For example, because the access point 304 may have a longer transmission range than the station, the station may be within the transmission range of the access point, while the access point is outside the transmission range of the station. In these embodiments, the AP 304 and the STA 306 may be able to communicate via the downlink (DL) connection 348 but may be only able to intermittently communicate via the uplink (UL) connection 349. In some embodiments, very little or no communication may be possible over uplink connection 349.

In certain aspects, if the AP 304 and the STA 306 have a poor connection and can communicate only intermittently or only via an DL transmission 348, a relay, such as the relay 320, may be set up to facilitate communication between the AP 304 and the STA 306.

Figure 4:
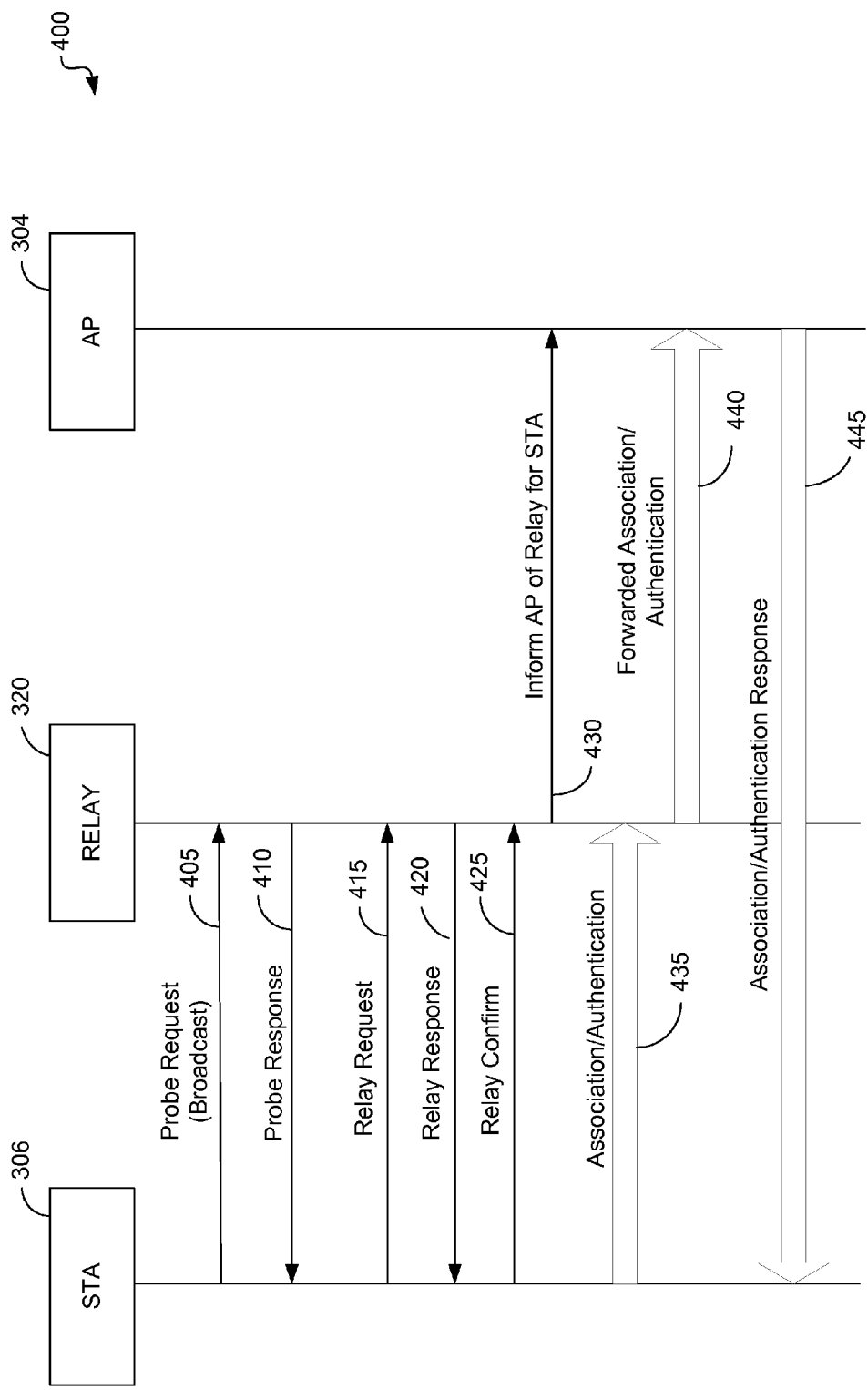
FIG. 4 illustrates a timing diagram 400 of a system including the AP 304, the STA 306, and the relay 320, where the relay 320 is a store and forward relay and all three devices communicate over a channel.

FIG. 4 illustrates a timing diagram 400 of a system including the AP 304, the STA 306, and the relay 320, where the relay 320 is a store and forward relay and all three devices communicate over a channel. The timing diagram illustrates a sequence of messages between the STA 306, relay 320, and AP 304 that establish an association between the STA 306 and the relay 320. When the illustrated sequence of messages has been performed, the relay 320 may provide relay services for communication between the STA 306 and the AP 304. Relay services may improve the ability of the AP 304 and the STA 306 to communicate. For example, the STA 306 may be within the transmit range of the AP 304, such that the STA 306 may receive transmissions of the AP 304. The AP 304 may be outside the transmit range of the STA 306, or may be intermittently able to receive transmissions from the STA 306.

Relay services may include the store and forwarding of data packets transmitted from the STA to the AP. Relay services may also include arbitration of a wireless medium. For example, the relay may respond to a request to send (RTS) network message with a clear to send (CTS) network message. Upon receiving the CTS from the relay, the STA and/or the AP may initiate transmission to the other node.

In an embodiment, the STA 306 generates a probe request 405 over the channel. In an embodiment, the probe request is addressed to one of a wildcard SSID and a BSSID of a BSS in which a relay operates. Upon receiving the probe request, the relay 320 transmits a probe response 410 to the STA 306. The probe response identifies the relay 320 to the STA 306. In an embodiment, the probe response also comprises an identification of an AP the relay is associated with and capabilities of the relay.

The STA 306 may then transmit a relay request 415 to the relay 320. The relay request message 415 requests that the relay provide relay services for packets transmitted by the STA 306 on the channel. In some implementations, the relay request 415 may use a public action frame. The relay 320 may acknowledge the STAs request by transmitting a relay response 420 to the STA 306. Once the relay response 420 is received by the STA 306, the STA 306 transmits a relay confirmation message 425 to the relay 320. Upon receipt of the relay confirmation message 425, the relay 320 may provide relay services for communication between the STA 306 and the AP 304 as described above.

For example, the STA 306 may transmit an association or authentication network message 435 to the relay 320. The relay 320 may then forward the association or authentication network message 440 to the AP 304. Upon receiving the association or authentication message 440, the AP 304 may respond by transmitting an association or authentication response 445 to the STA 306. In an embodiment, the association or authentication response 445 may include association identification.

Figure 3:
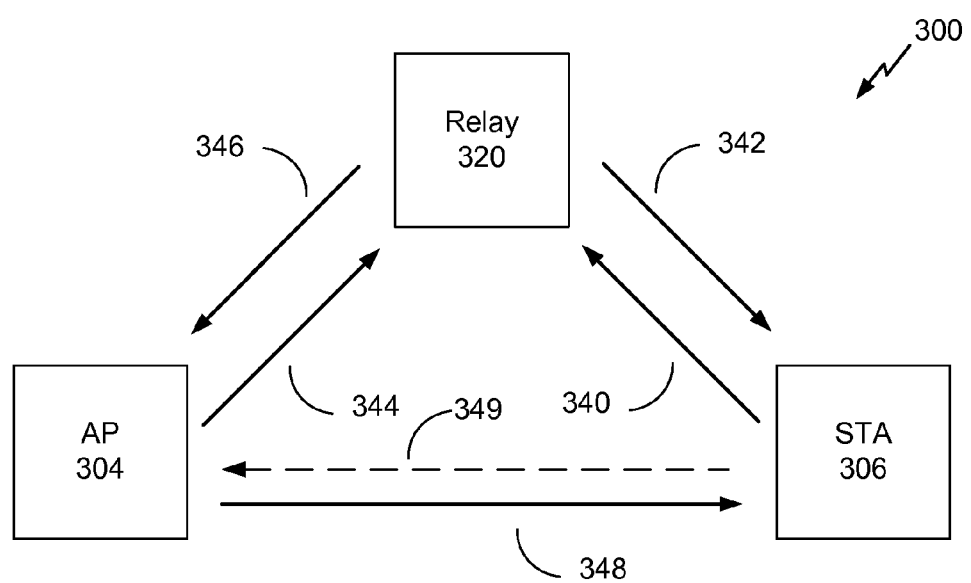
FIG. 3 illustrates a wireless communications system comprising an access point, a station, and a relay.
Figure 5A:
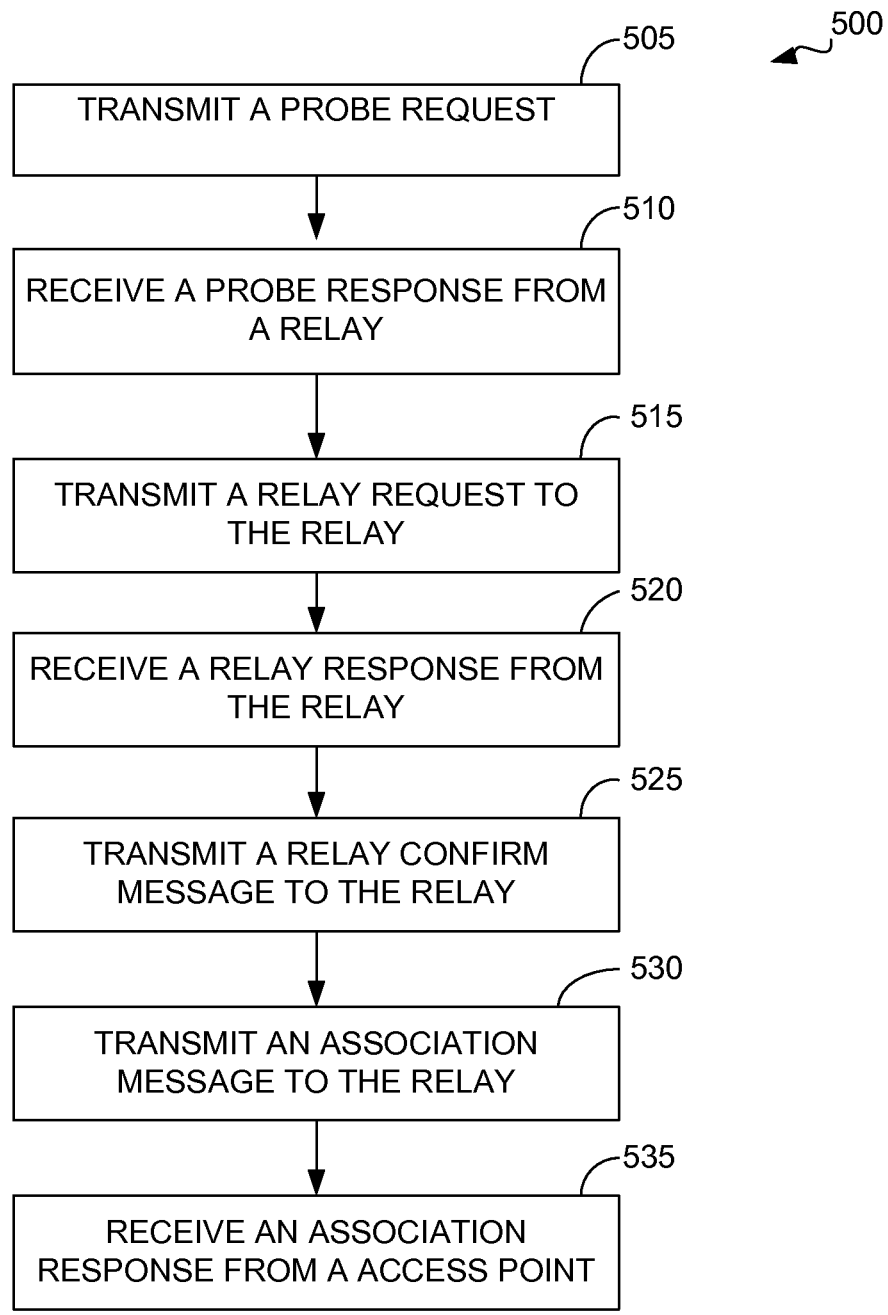
FIG. 5A is a flowchart of a process for establishing an association between a STA and a relay in the wireless communications system of FIGS. 1 and 3.

FIG. 5A is a flowchart of a process for establishing an association between a STA and a relay in the wireless communications system of FIGS. 1 and 3. In an embodiment, process 500 may be performed by a STA 306. In processing block 505, process 500 transmits a probe request. In one embodiment, the probe request may be broadcast. For example, in an embodiment, the probe request is addressed to one of a wildcard SSID and a BSSID of a BSS in which a relay operates. In processing block 510, a probe response is received from a relay. In an embodiment, the probe response comprises an identification of an AP the relay is associated with and capabilities of the relay.

In some implementations, multiple probe responses may be received from one or more relays in processing block 510. When multiple probe responses are received, a station (STA) may determine whether the multiple probe responses include multiple responses from the same relay. In some implementations, a STA may determine that responses have been received from more than one different relays. The STA in these implementations may select one or more relays for association, while not selecting one or more relays from which it received a probe response. The STA may prioritize the relays identified in the probe responses for selection based on one or more criteria. For example, the STA may determine the strength of a wireless signal between a relay identified in a probe response and the STA. In an embodiment, the STA may select one or more relays with the highest signal strength.

Once a relay is selected for association, a relay request message is transmitted to the selected relay by the STA. In an embodiment, the relay request message may correspond to message 415 illustrated in FIG. 4. In an embodiment, the relay request may include capabilities of the station. For example, capabilities of the STA 306 may include it's transmit range, a maximum and/or a minimum data rate, a type of data the STA 306 transmits, or the like. In an embodiment, the relay request may use a public action frame. A response to the relay request message is then received from the selected relay in processing block 520. In an embodiment, the relay response message may correspond to message 420 illustrated in FIG. 4. The relay response may include an indication of whether the relay will provide relay services to the device running process 500. In an embodiment, the relay response message received in block 520 may use a public action frame. In processing block 525, a relay confirmation message is sent from the STA to the relay. In an embodiment, the relay confirmation message may use a public action frame. The relay confirmation message indicates to the relay that it should now provide relay services for network traffic between the STA and the AP identified in the probe response.

In an embodiment, the process 500 then transmits an association message to the relay in processing block 530. In an embodiment, the association message may correspond to message 435 illustrated in FIG. 4. The association message may include station identification and capabilities information. An association response message may then be received from the access point in processing block 535. In an embodiment, the association response message may correspond to message 445 illustrated in FIG. 4.

Figure 5B:
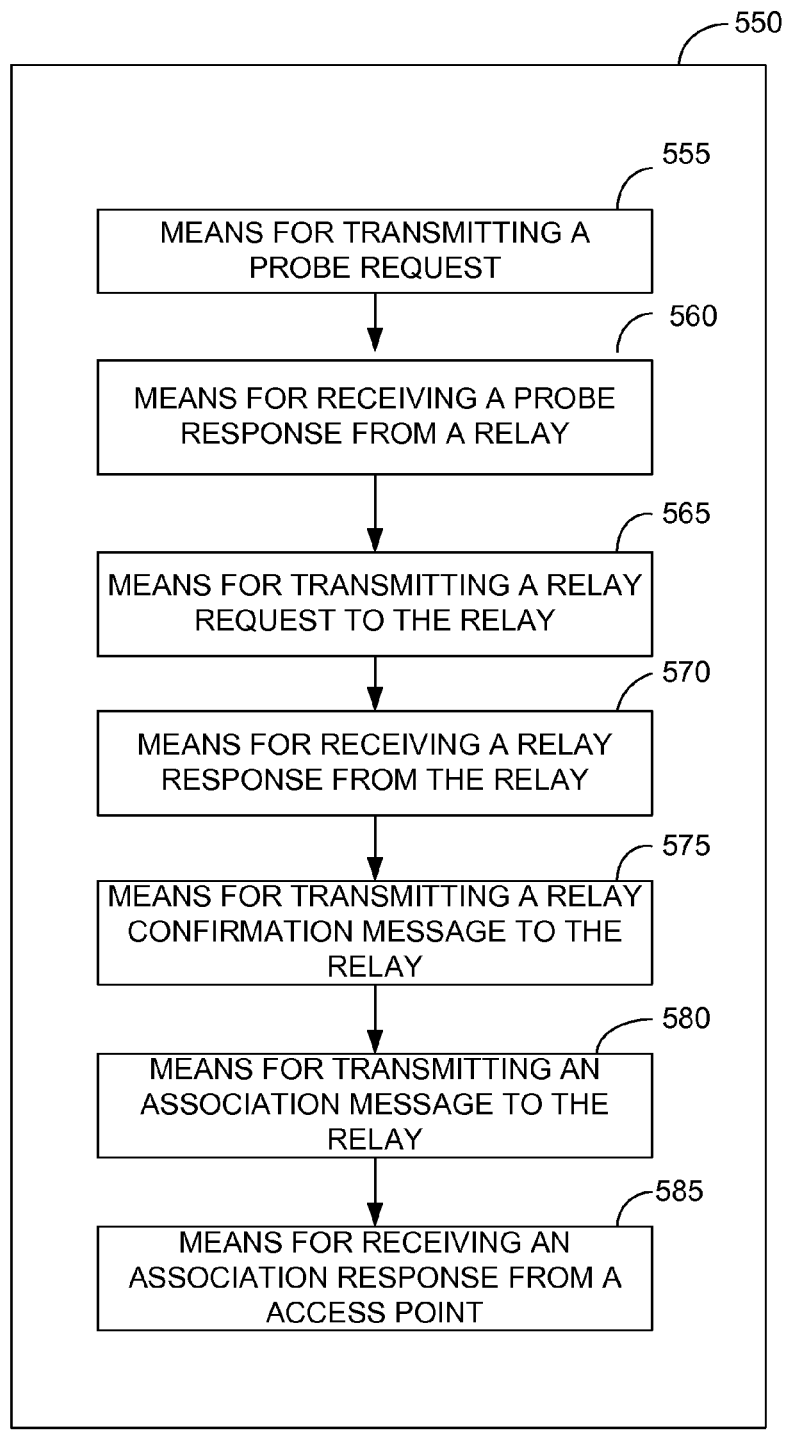
FIG. 5B is a functional block diagram of an exemplary device 550 that may be employed within the wireless communication system 100 or 300

FIG. 5B is a functional block diagram of an exemplary device 550 that may be employed within the wireless communication system 100 or 300. The device 550 includes means for transmitting a probe request 555. In an embodiment, means 555 may be configured to perform one or more of the functions discussed above with respect to block 505. In an embodiment, the means for transmitting a probe request may include a transmitter, such as transmitter 210 of FIG. 2. Means 555 may also include one or more of a processor, signal generator, transceiver, decoder, or a combination of hardware and/or software component(s), circuits, and/or module(s). The device 550 further includes means 560 for receiving a probe response from a relay. In an embodiment, means 560 may be configured to perform one or more of the functions discussed above with respect to block 510. The means 560 for receiving a probe response from a relay may include a receiver, such as receiver 212 of FIG. 2. Means 560 may also include one or more of a processor, signal generator, transceiver, decoder, or a combination of hardware and/or software component(s), circuits, and/or module(s). The device 550 further includes means 565 for transmitting a relay request to the relay. In an embodiment, means 565 may be configured to perform one or more of the functions discussed above with respect to block 515. In an embodiment, the means for transmitting a relay request to the relay 565 may include a transmitter, such as transmitter 210 of FIG. 2. Means 565 may also include one or more of a processor, signal generator, transceiver, decoder, or a combination of hardware and/or software component(s), circuits, and/or module(s). The device 550 further includes means 570 for receiving a relay response from the relay. In an embodiment, the means 570 may be configured to perform one or more of the functions discussed above with respect to block 520. The means 570 for receiving a relay response from the relay may include a receiver, such as receiver 212 of FIG. 2. Means 565 may also include one or more of a processor, signal generator, transceiver, decoder, or a combination of hardware and/or software component(s), circuits, and/or module(s). The device 550 further includes means 575 for transmitting a relay confirmation message to the relay. In an embodiment, the means 575 may be configured to perform one or more of the functions discussed above with respect to block 525. In an embodiment, the means for transmitting a relay confirmation message to the relay 575 may include a transmitter, such as transmitter 210 of FIG. 2. Means 575 may also include one or more of a processor, signal generator, transceiver, decoder, or a combination of hardware and/or software component(s), circuits, and/or module(s). The device 550 further includes means 580 for transmitting an association message to the relay. In an embodiment, the means 580 may be configured to perform one or more of the functions discussed above with respect to block 530. In an embodiment, the means for transmitting an association request to the relay 580 may include a transmitter, such as transmitter 210 of FIG. 2. Means 580 may also include one or more of a processor, signal generator, transceiver, decoder, or a combination of hardware and/or software component(s), circuits, and/or module(s). The device further includes means 585 for receiving an association response from the access point. In an embodiment, the means 585 may be configured to perform one or more of the functions discussed above with respect to block 535. The means 585 for receiving an association response from the access point may include a receiver, such as receiver 212 of FIG. 2. Means 585 may also include one or more of a processor, signal generator, transceiver, decoder, or a combination of hardware and/or software component(s), circuits, and/or module(s).

Figure 6A:
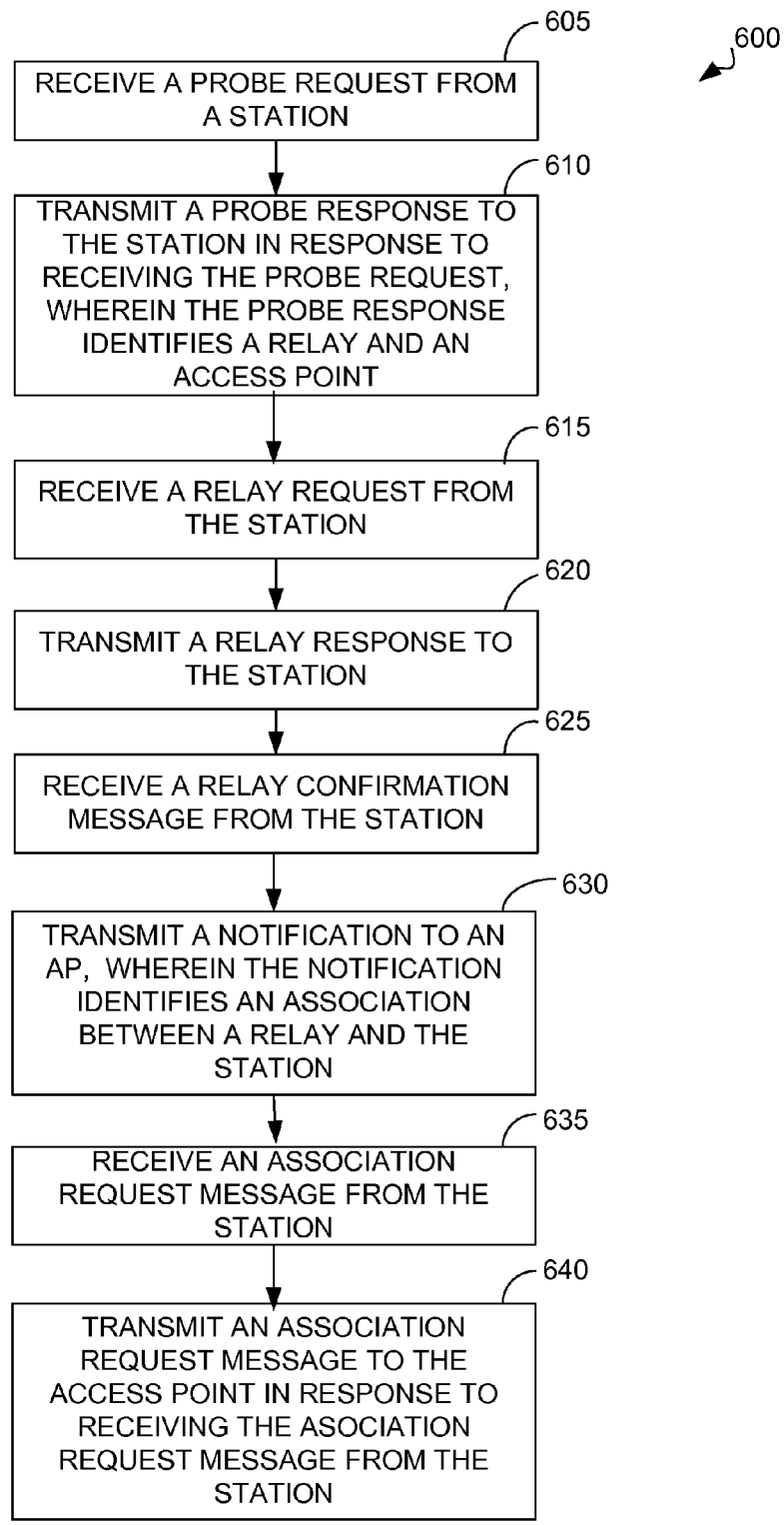
FIG. 6A is a flowchart of a process for establishing an association between a STA and a relay in the wireless communications system of FIGS. 1 and 3.

FIG. 6A is a flowchart of a process for establishing an association between a STA and a relay in the wireless communications system of FIGS. 1 and 3. In an embodiment, process 600 may be performed by a relay, for example, relay 320 illustrated in FIG. 3. In processing block 605, a probe request is received from a station. In an embodiment, the probe request includes information identifying a station that sent the probe request. In processing block 610, a probe response is sent to the station in response to receiving the probe request. The probe response identifies a relay and an access point. In processing block 615, a relay request message is received from the STA. In processing block 620, a relay response message is sent to the STA. In an embodiment, the relay request message and the relay response message may use public action frames. In processing block 625, a relay confirmation message is received from the STA. In processing block 630, a notification is sent to an access point (AP) identifying an association between the relay and the station (STA). In processing block 635, an association request message is received from the STA. In processing block 640, an association request message is sent to the AP in response to receiving the association request message from the STA.

In an embodiment, when the association message is received from the station, the device running process 600 may in response send an association message to an access point. In embodiment where an access point is outside the transmit range of a station, the station may still be able to associate with the access point by using the relay. The relay may substantially forward an association message received from a station to an access point. Upon receiving the association request from the relay, the access point may perform processing to determine if it will allow an association between the station and the access point. After the determination is made, the access point may send an association response to the station. Because the access point may have a higher transmit power than the station, the station may be able to receive transmissions directly from the access point. This may allow the station to receive the association response directly from the station.

Figure 6B:
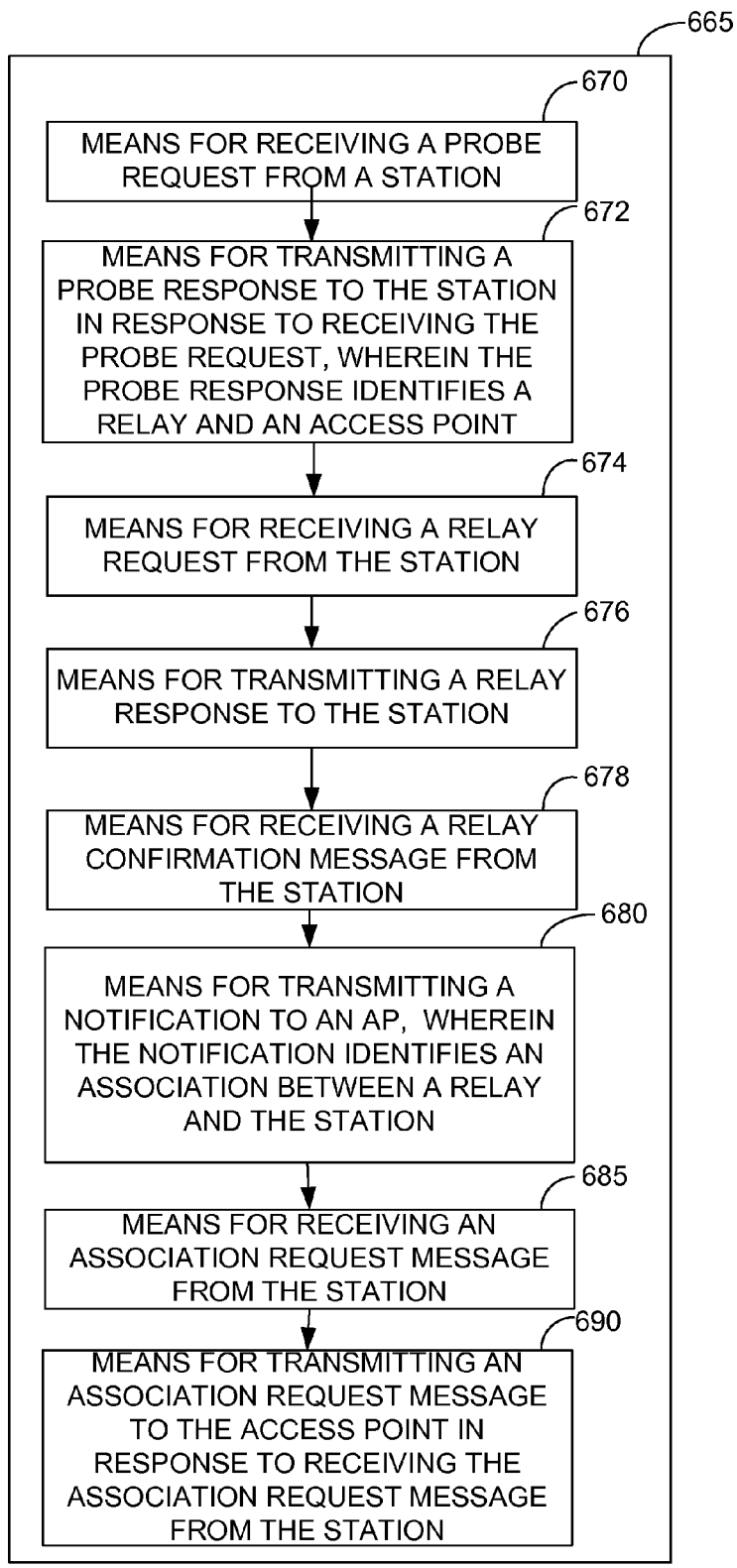
FIG. 6B is a functional block diagram of an exemplary device 665 that may be employed within the wireless communication system 100 or 300.

FIG. 6B is a functional block diagram of an exemplary device 665 that may be employed within the wireless communication system 100 or 300. The device 665 includes a means 670 for receiving a probe request from a station. In an embodiment, means 670 may be configured to perform one or more of the functions discussed above with respect to block 605. The means 670 for receiving a probe request from a station may include a receiver, such as receiver 212 of FIG. 2. Means 670 may also include one or more of a processor, signal generator, transceiver, decoder, or a combination of hardware and/or software component(s), circuits, and/or module(s). The device 665 further includes means 672 for transmitting a probe response to the station. In an embodiment, means 672 may be configured to perform one or more of the functions discussed above with respect to block 610. In an embodiment, the means for transmitting a probe response to the station 672 may include a transmitter, such as transmitter 210 of FIG. 2. Means 672 may also include one or more of a processor, signal generator, transceiver, decoder, or a combination of hardware and/or software component(s), circuits, and/or module(s). The device 665 further includes means 674 for receiving a relay request from the station. In an embodiment, means 674 may be configured to perform one or more of the functions discussed above with respect to block 615. The means 674 for receiving a relay request from the station may include a receiver, such as receiver 212 of FIG. 2. Means 674 may also include one or more of a processor, signal generator, transceiver, decoder, or a combination of hardware and/or software component(s), circuits, and/or module(s). The device 665 further includes means 676 for transmitting a relay response to the station. In an embodiment, means 676 may be configured to perform one or more of the functions discussed above with respect to block 620. In an embodiment, the means for transmitting a relay response to the station 676 may include a transmitter, such as transmitter 210 of FIG. 2. Means 676 may also include one or more of a processor, signal generator, transceiver, decoder, or a combination of hardware and/or software component(s), circuits, and/or module(s). The device 665 further includes means 678 for receiving a relay configuration message from the station. In an embodiment, means 678 may be configured to perform one or more of the functions discussed above with respect to block 625. The means 678 for receiving a relay configuration message from the station may include a receiver, such as receiver 212 of FIG. 2. Means 678 may also include one or more of a processor, signal generator, transceiver, decoder, or a combination of hardware and/or software component(s), circuits, and/or module(s). The device 665 further includes means 680 for transmitting a notification to an access point. The notification identifies an association between a relay and the station. In an embodiment, means 680 may be configured to perform one or more of the functions discussed above with respect to block 630. In an embodiment, the means for transmitting a notification to an access point 680 may include a transmitter, such as transmitter 210 of FIG. 2. Means 680 may also include one or more of a processor, signal generator, transceiver, decoder, or a combination of hardware and/or software component(s), circuits, and/or module(s). The device 665 further includes means 685 for receiving an association message from the station. In an embodiment, means 685 may be configured to perform one or more of the functions discussed above with respect to block 635. The means 685 for receiving an association message may include a receiver, such as receiver 212 of FIG. 2. Means 685 may also include one or more of a processor, signal generator, transceiver, decoder, or a combination of hardware and/or software component(s), circuits, and/or module(s). The device 665 further includes means 690 for transmitting an association request to the access point in response to receiving the association request from the station. In an embodiment, means 690 may be configured to perform one or more of the functions discussed above with respect to block 640. In an embodiment, the means for transmitting an association request to the access point in response to receiving the association request from the station 690 may include a transmitter, such as transmitter 210 of FIG. 2. Means 690 may also include one or more of a processor, signal generator, transceiver, decoder, or a combination of hardware and/or software component(s), circuits, and/or module(s).

Figure 6C:
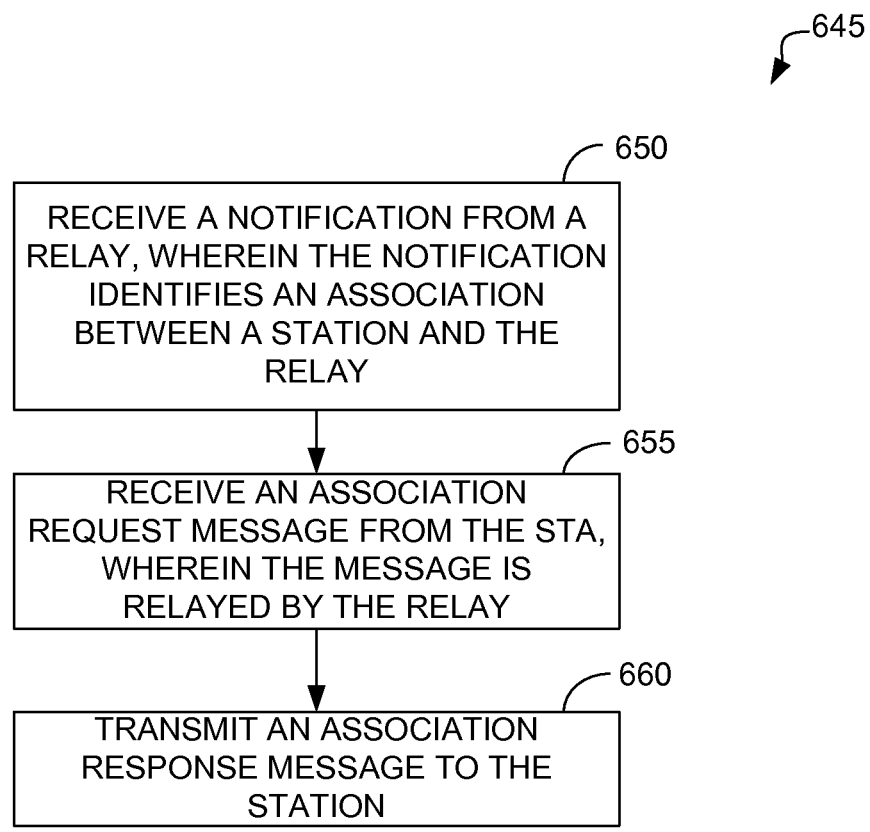
FIG. 6C is a flowchart of a process for establishing an association between a STA and a relay in the wireless communications system of FIGS. 1 and 3.

FIG. 6C is a flowchart of a process for establishing an association between a station and a relay in the wireless communications system of FIGS. 1 and 3. In an embodiment, process 645 may be performed by an access point, such as access point 304 illustrated in FIG. 3. In processing block 650, a notification is received from a relay. The notification identifies an association between a station and the relay. In processing block 655, an association request message is received from the station, wherein the message is relayed by the relay. In processing block 660, an association response message is transmitted to the station.

Figure 6D:
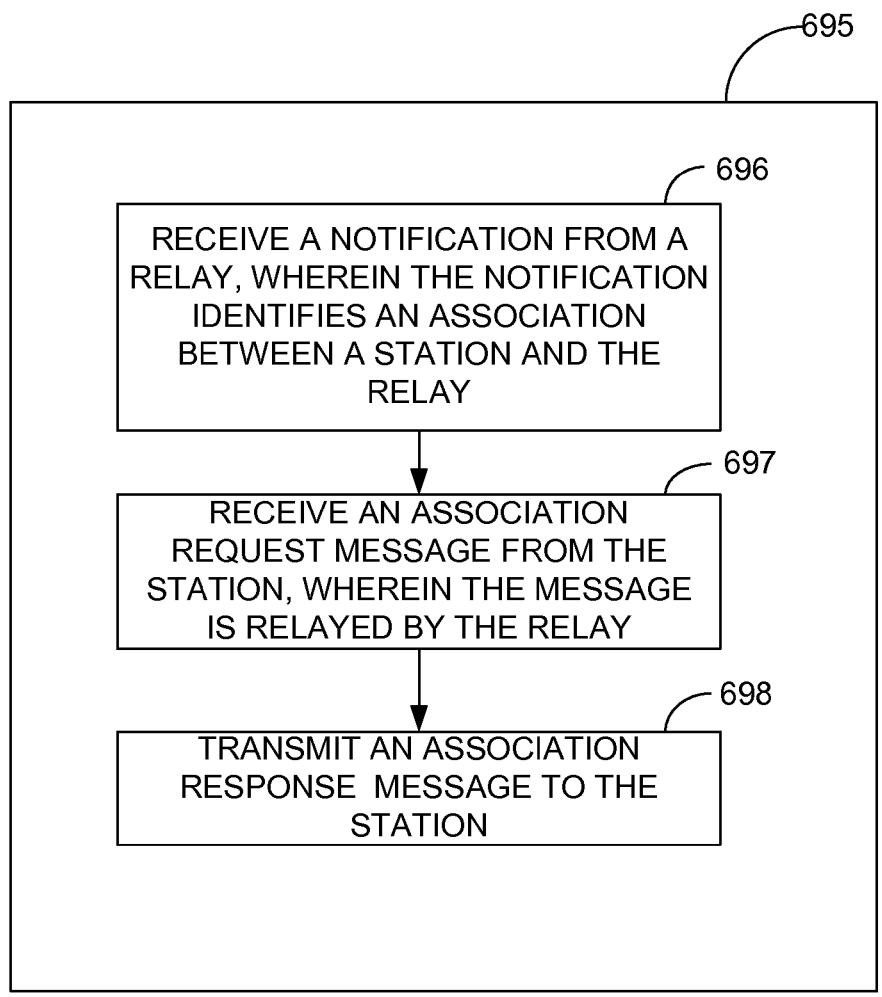
FIG. 6D is a functional block diagram of an exemplary device 695 that may be employed within the wireless communication system 100 or 300

FIG. 6D is a functional block diagram of an exemplary device 695 that may be employed within the wireless communication system 100 or 300. The device 695 includes a means 696 for receiving a notification from a relay. The notification identifies an association between a station and the relay. In an embodiment, means 696 may be configured to perform one or more of the functions discussed above with respect to block 650. In an embodiment, the means for receiving a notification from a relay 696 may include a receiver, such as receiver 212 of FIG. 2. Means 696 may also include one or more of a processor, signal generator, transceiver, decoder, or a combination of hardware and/or software component(s), circuits, and/or module(s). The device 665 further includes means 697 for receiving an association request message from the STA. The association request message is relayed by the relay. In an embodiment, means 697 may be configured to perform one or more of the functions discussed above with respect to block 655. In an embodiment, the means for receiving an association request message from the STA 697 may include a receiver, such as receiver 212 of FIG. 2. Means 697 may also include one or more of a processor, signal generator, transceiver, decoder, or a combination of hardware and/or software component(s), circuits, and/or module(s). The device 695 further includes means 698 for transmitting an association request message to the access point in response to receiving the association request message from the station. In an embodiment, means 698 may be configured to perform one or more of the functions discussed above with respect to block 660. In an embodiment, the means for transmitting an association request message to the access point in response to receiving the association request message from the station 698 may include a transmitter, such as transmitter 210 of FIG. 2. Means 698 may also include one or more of a processor, signal generator, transceiver, decoder, or a combination of hardware and/or software component(s), circuits, and/or module(s).

Figure 7:
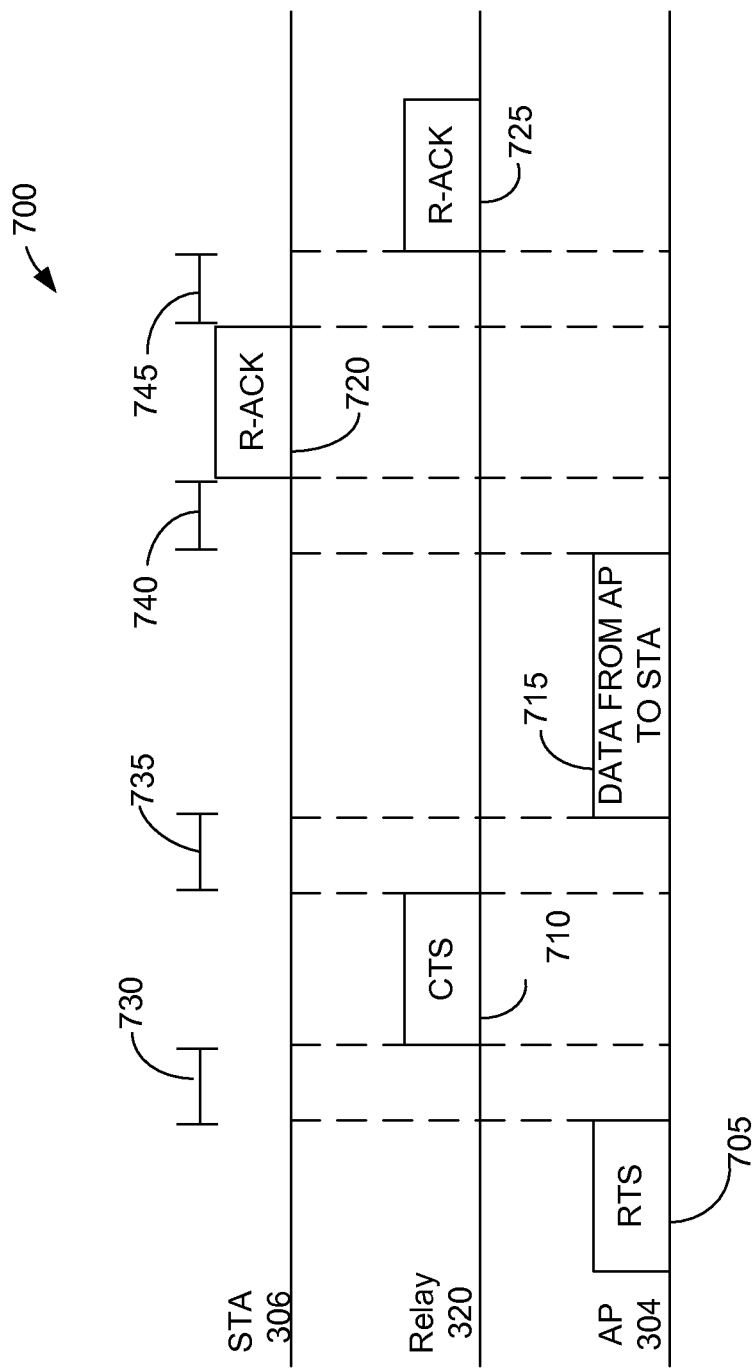
FIG. 7 illustrates a timing diagram 700 of a system including the AP 304, the STA 306, and the relay 320, where the relay 320 is store and forward relay and all three devices communicate over a channel.

FIG. 7 illustrates a timing diagram 700 of a system including the AP 304, the STA 306, and the relay 320, where the relay 320 is a store and forward relay and all three devices communicate over a channel. In an embodiment, the AP 304 may be outside the transmit range of the STA 306, and the relay 320 retransmits messages transmitted by the STA 306 to the AP 304. In another embodiment, the AP 304 may be able to intermittently receive transmissions from the STA 306. In this embodiment, the relay 320 may also retransmit messages transmitted by the STA 306 to the AP 304.

The timing diagram begins on the left with the AP 304 transmitting a request to send message (RTS) 705. After a first time period 730, the relay 320 responds to the RTS 705 with a clear to send message (CTS) 710. In one embodiment, the first time period 730 may be substantially equivalent to a Short Inter-Frame Space (SIFS) period. After a second time period 735, the access point (AP) 304 transmits data to the STA 306 as data packet 715. In one embodiment, the second time period 735 may be substantially equivalent to a SIFS period. After a third time period 740, the STA 306 responds to the data packet 715 from the AP 304 with a relay-able acknowledgement (R-ACK) 720. The relay-able acknowledgement (R-ACK) 720 includes a sequence number identifying the data being acknowledged. For example, in the illustrated example, the R-ACK 720 includes a first sequence number identifying data sent in data packet 715. The relay-able acknowledgement may also include an address of a node transmitting the relay-able acknowledgement. In one embodiment, the third time period 740 may be substantially equivalent to a SIFS period. When the R-ACK 720 is transmitted by the STA 306 to the AP 304, it may also be received or intercepted by the relay 320. The relay 320 may then monitor network activity to determine whether the access point 304 received the R-ACK 725. For example, if the access point 304 transmits on the network after R-ACK 720 is transmitted by the STA 304, the relay may determine that the R-ACK 720 has been received by the AP 304. If access point 304 does not transmit on the network after R-ACK 720 is transmitted by the STA 304, relay 320 may determine that AP 304 did not receive the R-ACK 720. In this case, after a fourth time period 745, the relay retransmits the R-ACK 720 as R-ACK 725. R-ACK 725 also includes the first sequence number. In an embodiment, the relay may unconditionally retransmit the R-ACK 720 as R-ACK 725. In one embodiment, the fourth time period 745 may be substantially equivalent to a SIFS period. In an embodiment, the R-ACK 725 also includes a sender's address. In an embodiment, the relay may set the sender's address in the R-ACK 725 to be the address of the STA 306.

Figure 8A:
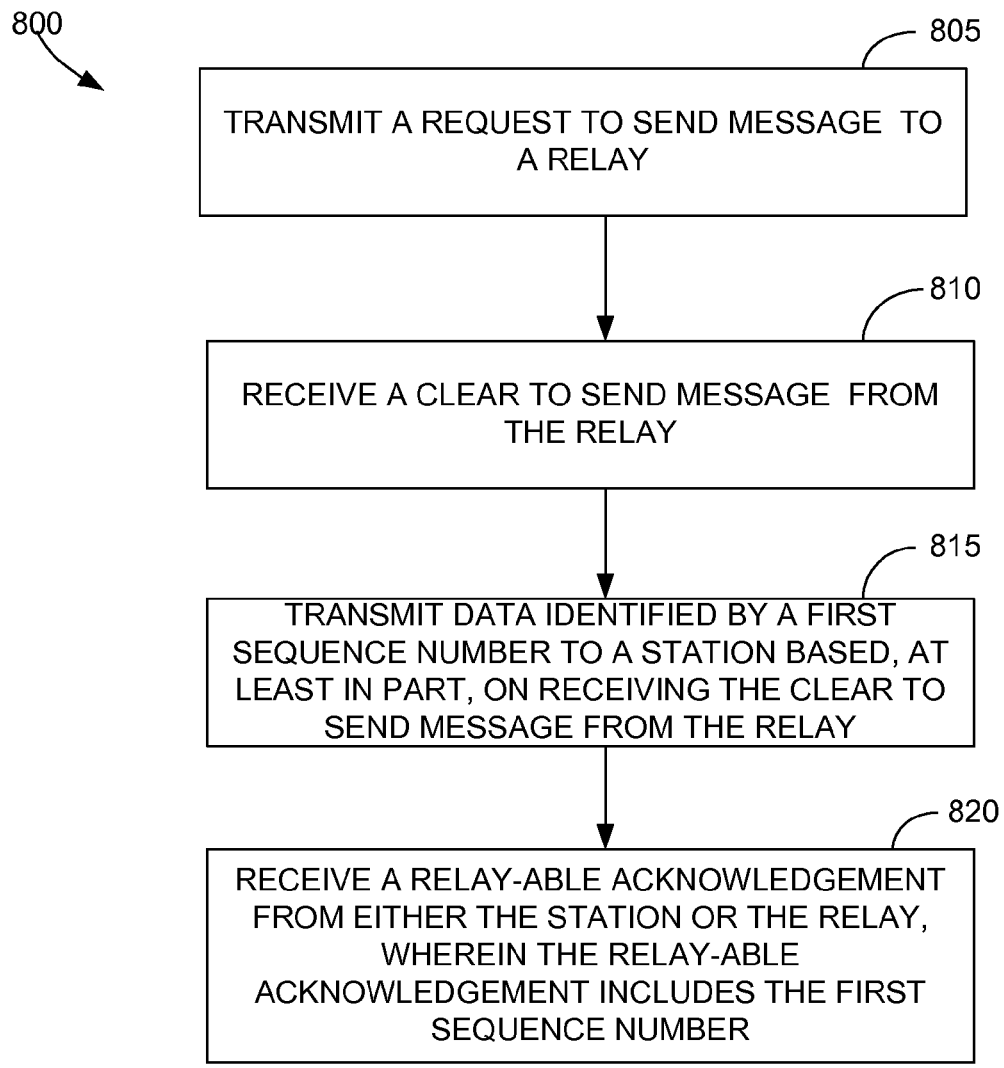
FIG. 8A is a flowchart of a process for transmitting data from a first station to a second station in the wireless communications system of FIGS. 1 and 3.

FIG. 8A is a flowchart of a process for transmitting data from a first station to a second station in the wireless communications system of FIGS. 1 and 3. In some aspects, the first station may be an access point. In some aspects, process 800 is a method of relaying data in an 802.11 wireless communications network between a station and an access point using a relay. In an embodiment, process 800 may be performed by an access point, such as access point 304 illustrated in FIG. 3. In some other aspects, process 800 may be performed by a node operating as an access point. For example, a relay may operate as an access point in some embodiments. In some other embodiments, a station may operate as an access point.

In processing block 805, a request to send message (RTS) is transmitted or sent by process 800 to a relay, such as relay 320. In an embodiment, processing block 805 may be implemented by the transmitter 210. In processing block 810, a clear to send message (CTS) is received from the relay. In an embodiment, processing block 810 may be implemented by the receiver 212. In processing block 815, data identified by a first sequence number is transmitted to the STA based, at least in part, on receiving the CTS from the relay. In an embodiment, processing block 815 may be implemented by the transmitter 210. In processing block 820, an acknowledgement is received from either the STA or the relay which includes the first sequence number. The acknowledgement is a relay-able acknowledgement. A relay-able acknowledgement may specify a data sequence number corresponding to the data being acknowledged. In some implementations, the sequence number may ensure the idempotency of the acknowledgement, in that, no adverse effects result if more than one acknowledgement is received including the same sequence number. The relay-able acknowledgement may also include a sender's or transmitter's address. In an embodiment, including the transmitter's address in the relay-able acknowledgment may allow a receiving node to correlate the sequence number in the relay-able acknowledgement with a network connection state for the transmitting node maintained by the receiving node. In an embodiment, processing block 820 may be implemented by the receiver 212.

Figure 8B:
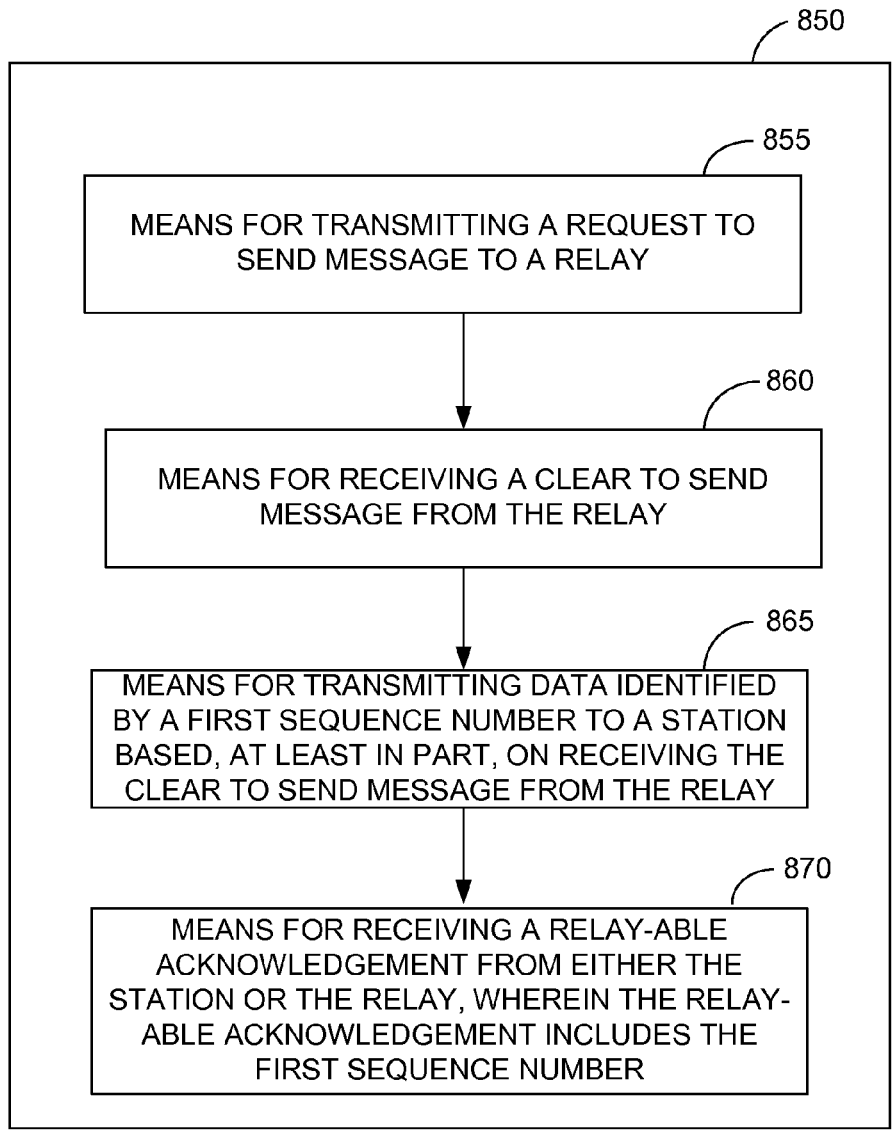
FIG. 8B is a functional block diagram of an exemplary device 850 that may be employed within the wireless communication system 100 or 300.

FIG. 8B is a functional block diagram of an exemplary device 850 that may be employed within the wireless communication system 100 or 300. The device 850 includes means 855 for transmitting a request to send message (RTS) to a relay. In an embodiment, means 855 may be configured to perform one or more of the functions discussed above with respect to block 805. In an embodiment, the means for transmitting a request to send message (RTS) to a relay 855 may include a transmitter, such as transmitter 210 of FIG. 2. Means 855 may also include one or more of a processor, signal generator, transceiver, decoder, or a combination of hardware and/or software component(s), circuits, and/or module(s). The device 850 further includes means 860 for receiving a clear to send message (CTS) from the relay. In an embodiment, means 860 may be configured to perform one or more of the functions discussed above with respect to block 810. The means 860 for receiving a clear to send message (CTS) from the relay may include a receiver, such as receiver 212 of FIG. 2. Means 860 may also include one or more of a processor, signal generator, transceiver, decoder, or a combination of hardware and/or software component(s), circuits, and/or module(s). The device 850 further includes means 865 for transmitting or sending data identified by a first sequence number to a station based, at least in part, on receiving the CTS from the relay. In an embodiment, means 865 may be configured to perform one or more of the functions discussed above with respect to block 815. In an embodiment, the means for transmitting data identified by a first sequence number to a station based, at least in part, on receiving the CTS from the relay 865 may include a transmitter, such as transmitter 210 of FIG. 2. Means 865 may also include one or more of a processor, signal generator, transceiver, decoder, or a combination of hardware and/or software component(s), circuits, and/or module(s). The device 850 further includes means 870 for receiving a relay-able acknowledgement (R-ACK) from either the station or the relay, wherein the R-ACK includes the first sequence number. In an embodiment, means 870 may be configured to perform one or more of the functions discussed above with respect to block 820. The means 870 for receiving a relay-able acknowledgement from either the station or the relay may include a receiver, such as receiver 212 of FIG. 2. Means 870 may also include one or more of a processor, signal generator, transceiver, decoder, or a combination of hardware and/or software component(s), circuits, and/or module(s).

Figure 9:
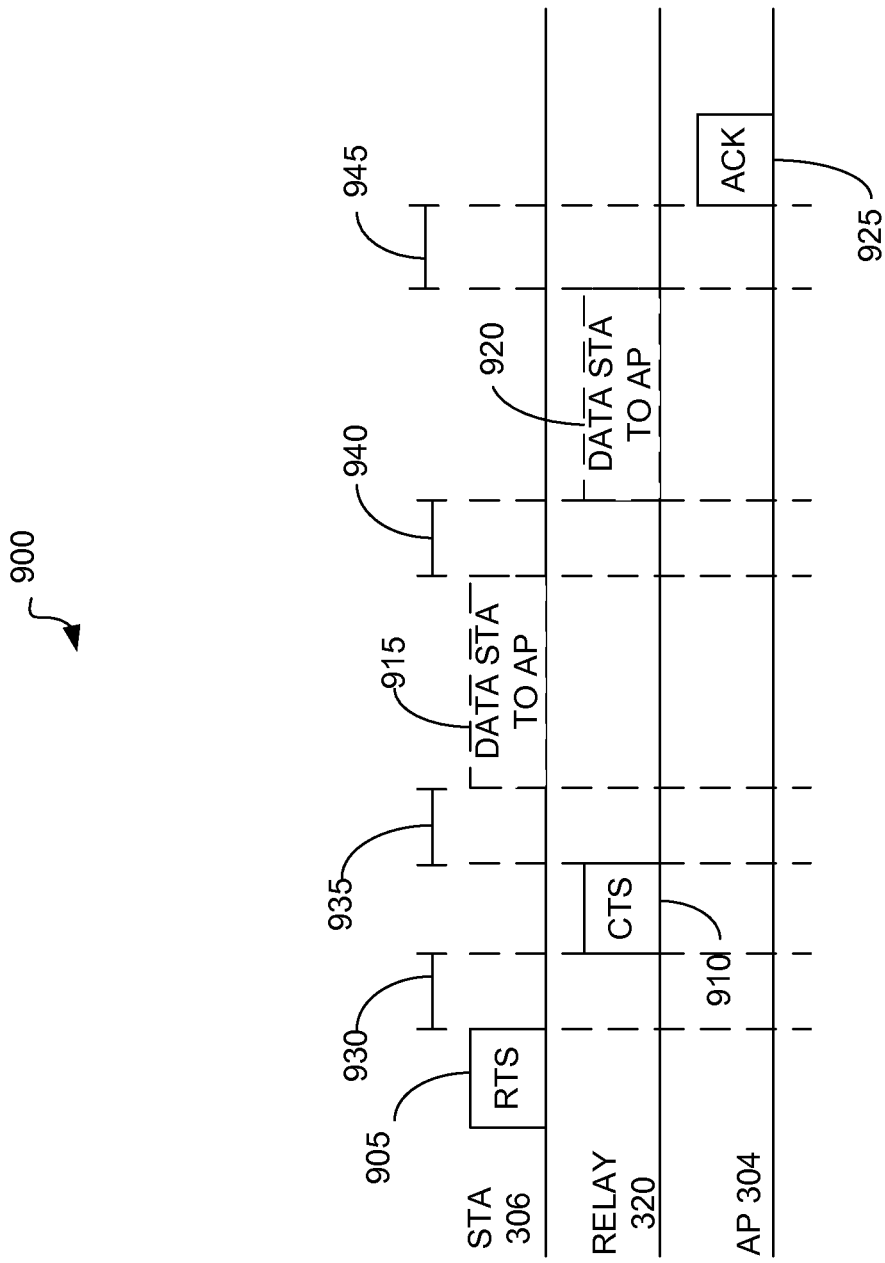
FIG. 9 illustrates a timing diagram 900 of a system including the AP 304, the STA 306, and the relay 320, where the relay 320 is store and forward relay and all three devices communicate over a channel.

FIG. 9 illustrates a timing diagram 900 of a system including the AP 304, the STA 306, and the relay 320, where the relay 320 is a store and forward relay and all three devices communicate over a channel. Timing diagram 900 illustrates one embodiment of a STA 306 transmitting data to an AP 304. In one embodiment, the AP 304 may be outside the transmit range of the STA 306. In another embodiment, the AP 304 may be intermittently able to receive communications transmitted by the STA 306.

The timing diagram begins with the STA 306 transmitting a request to send message (RTS) 905 to the relay 320. After a first time period 930, the relay 320 responds with a clear to send (CTS) message 910. In one embodiment, the first time period 930 may be substantially equivalent to a SIFS time period. After a second time period 935, the STA 306 transmits data to the AP 304 with data packet 915. In one embodiment, the second time period 935 may be substantially equivalent to a SIFS time period. When the STA 306 transmits the data to the AP 304, the data may be intercepted or received by the relay. The data may be received by the relay even though the receiver address specified in a data packet including the data is not the relay's address. The relay may then monitor the network activity of the AP 304 to determine if it acknowledges the data. If no acknowledgement of the data packet 915 is detected by the relay 320, the relay 320 may determine that the AP 304 did not receive the data packet 915. In this case, after a third time period 940, the relay 320 may retransmit the data packet 915 as data packet 920. In one embodiment, the third time period 940 may be substantially equivalent to a Point Coordination Function Inter-frame Space (PIFS) time period. After a fourth time period 945, the access point 304 may acknowledge the data packet 915 or 920 with acknowledgement message 925.

Figure 10A:
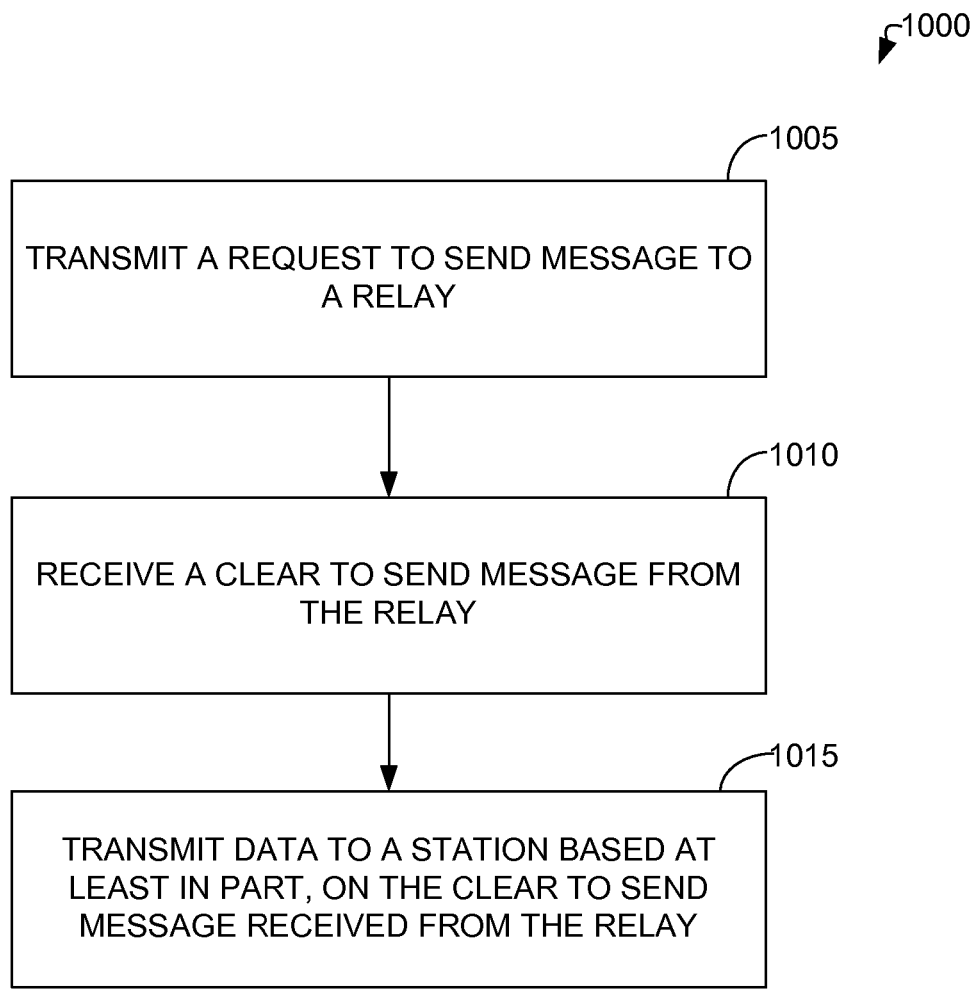
FIG. 10A is a flowchart of a process for transmitting data from a first station to a second station in the wireless communications system of FIGS. 1 and 3.

FIG. 10A is a flowchart of a process for transmitting data from a first station to a second station in the wireless communications system of FIGS. 1 and 3. In some aspects, the second station may be an access point. In some aspects, process 1000 is a method of relaying data in an 802.11 wireless communications network between a station and an access point using a relay. In an embodiment, process 1000 may be performed by a station, such as station 306 illustrated in FIG. 3. In processing block 1005, process 1000 transmits a request to send message (RTS) to a relay. In an embodiment, processing block 1005 may be implemented by the transmitter 210. In processing block 1010, a clear to send message (CTS) is received from the relay. In an embodiment, processing block 1010 may be implemented by the receiver 212. In processing block 1015, data is transmitted to the second station based, at least in part, on the CTS received from the relay. In an embodiment, processing block 15 may be implemented by the transmitter 210.

Figure 10B:
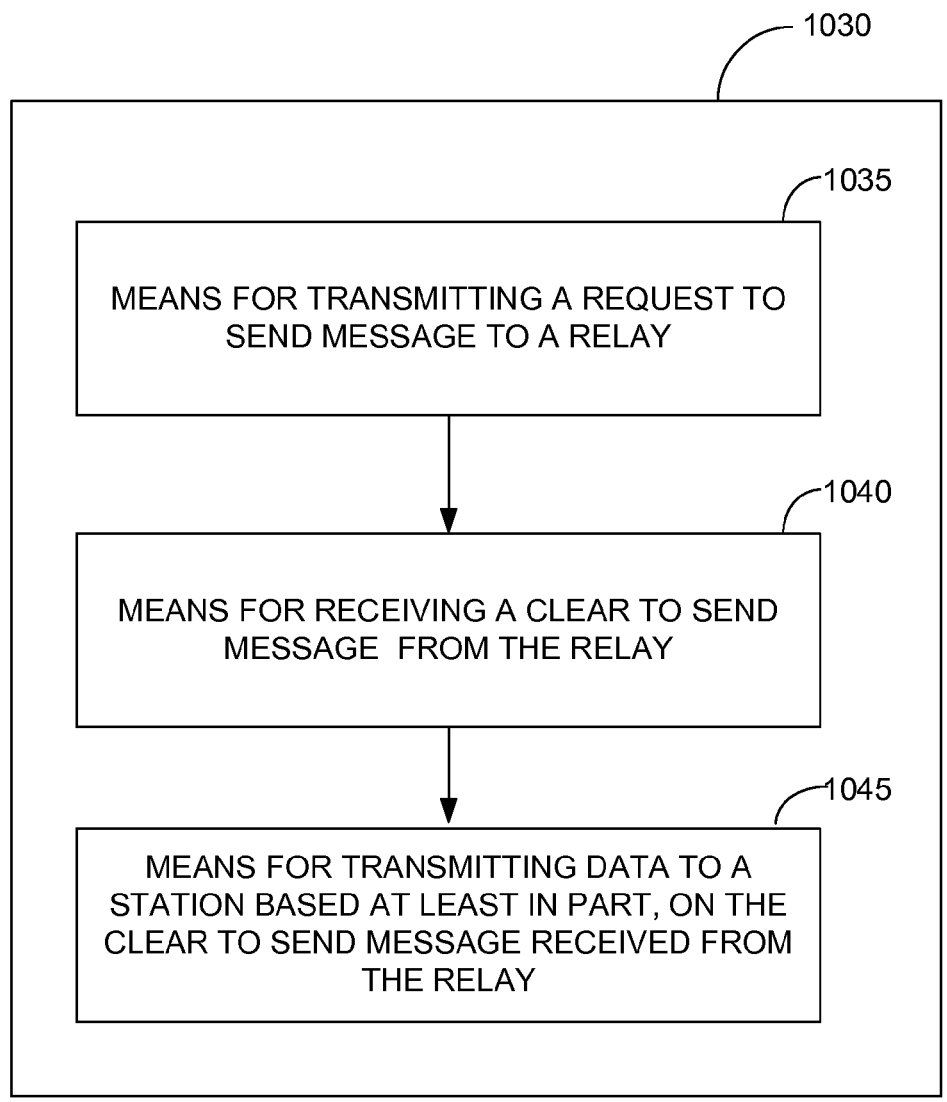
FIG. 10B is a functional block diagram of an exemplary device 1030 that may be employed within the wireless communication system 100 or 300.

FIG. 10B is a functional block diagram of an exemplary device 1030 that may be employed within the wireless communication system 100 or 300. The device 1030 includes means 1035 for transmitting a request to send message to a relay. In an embodiment, means 1035 may be configured to perform one or more of the functions discussed above with respect to block 1005. In an embodiment, the means for transmitting a request to send message to a relay 1035 may include a transmitter, such as transmitter 210 of FIG. 2. Means 1035 may also include one or more of a processor, signal generator, transceiver, decoder, or a combination of hardware and/or software component(s), circuits, and/or module(s). The device 1030 further includes means 1040 for receiving a clear to send message from the relay. In an embodiment, means 1040 may be configured to perform one or more of the functions discussed above with respect to block 1010. The means 1040 for receiving a clear to send message from the relay may include a receiver, such as receiver 212 of FIG. 2. Means 1040 may also include one or more of a processor, signal generator, transceiver, decoder, or a combination of hardware and/or software component(s), circuits, and/or module(s). The device 1030 further includes means 1045 for transmitting data to a station based at least in part, on the CTS received from the relay. In an embodiment, means 1045 may be configured to perform one or more of the functions discussed above with respect to block 1015. In an embodiment, the means for transmitting data to a station based at least in part, on the CTS received from the relay may include a transmitter, such as transmitter 210 of FIG. 2. Means 1045 may also include one or more of a processor, signal generator, transceiver, decoder, or a combination of hardware and/or software component(s), circuits, and/or module(s).

Figure 11A:
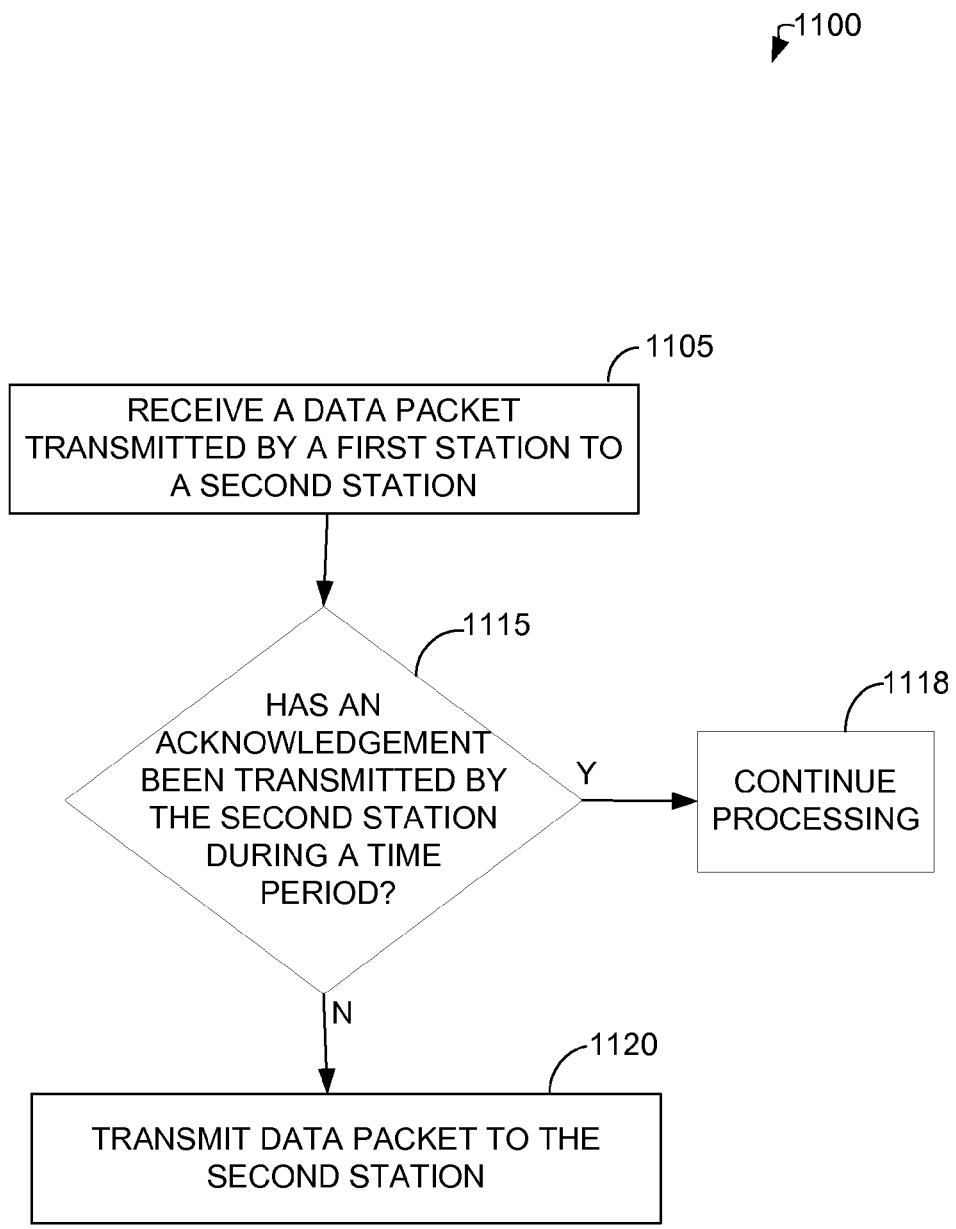
FIG. 11A is a flowchart of a process for transmitting data from a first station to a second station in the wireless communications system of FIGS. 1 and 3.

FIG. 11A is a flowchart of a process for transmitting data from a first station (STA) to a second station in the wireless communications system of FIGS. 1 and 3. In some aspects, the second station is an access point. In some aspects, process 1100 is a method of relaying data in an 802.11 wireless communications network between a station and an access point using a relay. In an embodiment, process 1100 may be performed by a store and forward relay, such as relay 320 illustrated in FIG. 3. In processing block 1105 a data packet transmitted by a first station to a second station is received or intercepted. In some implementations, a relay running process 1100 may intercept or receive wireless packets with a destination address other than the relay itself. For example, the data packet received in processing block 1105 may have a destination address of the second station. However, because the data packet may be transmitted over a wireless network, the data packet can be received by a relay regardless of the destination address specified in the data packet. In an embodiment, processing block 1105 may be implemented by the receiver 212. In decision block 1115, process 1100 determines if an acknowledgement packet has been transmitted by the second station for the data received in processing block 1105 during a time period. In an embodiment, the time period may be at least one PCF Inter-frame Space (PIFS) time period. If the second station did acknowledgement the data during the time period, the relay does not need to retransmit the data, since the second station successfully received it. In this case, process 1100 may continue other processing in block 1118. In an embodiment, processing block 1105 may be implemented by the processor 204. If no acknowledgement has been transmitted during the time period, processing block 1120 transmits the data received or intercepted from the first station to the second station. In an embodiment, processing block 1120 may be implemented by the transmitter 210.

Figure 11B:
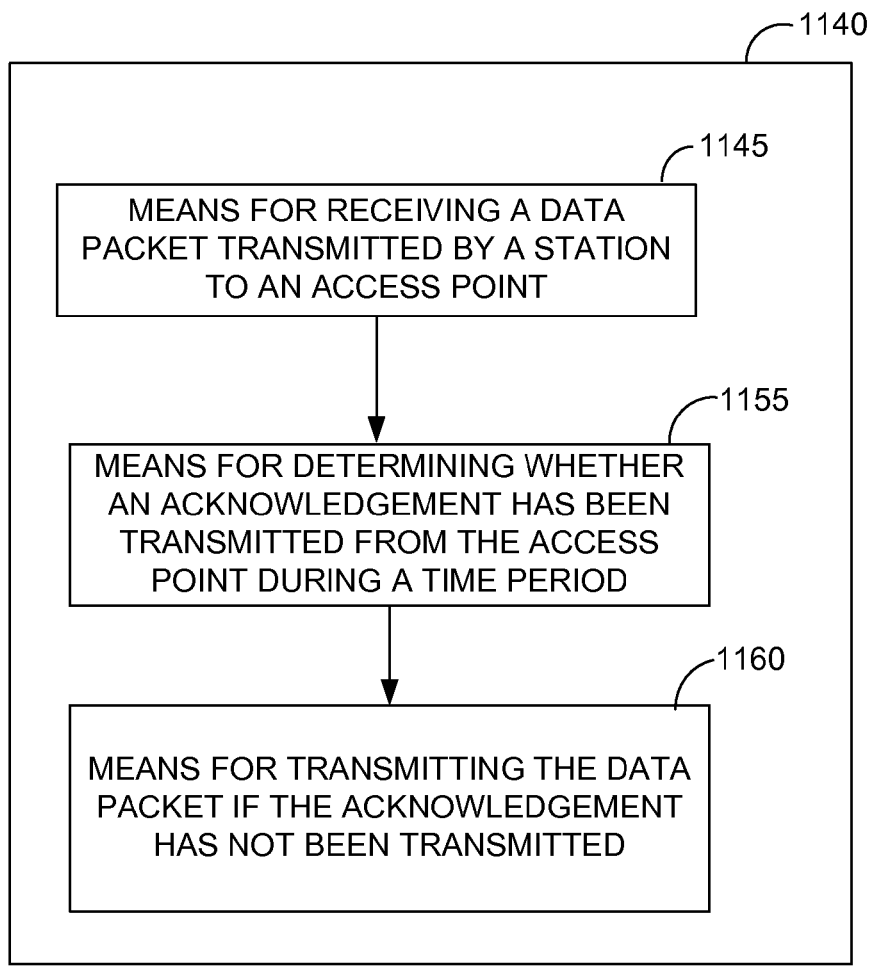
FIG. 11B is a functional block diagram of an exemplary device 1140 that may be employed within the wireless communication system 100 or 300.

FIG. 11B is a functional block diagram of an exemplary device 1140 that may be employed within the wireless communication system 100 or 300. The device 1140 includes means 1145 for receiving a data packet transmitted by a first station to a second station. In an embodiment, means 1145 may be configured to perform one or more of the functions discussed above with respect to block 1105. The means 1145 for receiving a data packet transmitted from a first station to a second station may include a receiver, such as receiver 212 of FIG. 2. Means 1145 may also include one or more of a processor, signal generator, transceiver, decoder, or a combination of hardware and/or software component(s), circuits, and/or module(s). The device 1140 further includes means 1155 for determining whether an acknowledgement packet has been transmitted by the second station during a time period. In an embodiment, the time period may be substantially equivalent to a PCF Inter-frame Space (PIFS) time period. In an embodiment, means 1155 may be configured to perform one or more of the functions discussed above with respect to block 1115. In an embodiment, the means 1155 for determining whether an acknowledgement packet has been transmitted by the second station during a time period may include a processor, such as processor 204 of FIG. 2. Means 1155 may also include one or more of a processor, signal generator, transceiver, decoder, or a combination of hardware and/or software component(s), circuits, and/or module(s). The device 1140 further includes means 1160 for transmitting the data packet to the second station if the acknowledgement has not been transmitted. In an embodiment, means 1160 may be configured to perform one or more of the functions discussed above with respect to block 1120. In an embodiment, the means for transmitting the data packet to the second station if the acknowledgement has not been transmitted 1160 may include a transmitter, such as transmitter 210 of FIG. 2. Means 1160 may also include one or more of a processor, signal generator, transceiver, decoder, or a combination of hardware and/or software component(s), circuits, and/or module(s).

FIG. 12A illustrates a timing diagram 1200 of a system including the AP 304, the STA 306, and the relay 320, where the relay 320 is store and forward relay and all three devices communicate over a channel. FIG. 12A illustrates a method of transmitting data on a wireless network. Specifically, FIG. 12A illustrates transmitting data from an access point to a station (STA) 306. In the illustrated embodiment of FIG. 12A, the station 306 may be within the transmit range of the access point 304, but the access point 304 may not be within the transmit range of the station 304. The relay 320 may be within the transmit range of both the station 306 and the access point 304. Note that in some aspects, the access point may instead be a node operating as an access point on the network. For example, a relay may operate as an access point in some embodiments, for example, network environments that are configured with multiple relays between a station and a true access point may include one or more relays that appear as access points to at least some nodes within the network environment. In some other embodiments, a station may operate as an access point.

The timing diagram starts with the access point (AP) 304 transmitting data to the STA 306. This is represented as data packet 1205. After a first period of time 1220, the STA 306 responds with a relay-able acknowledgement 1210. In some implementations the first period of time may be equivalent to a Short Inter Frame Space (SIPS) time period. In an embodiment, the AP 304 may be outside the transmit range of the STA 306. In this embodiment, the AP 304 may not receive the relay-able acknowledgement 1210. Therefore, after a second time period, the relay 320 retransmits the relay-able-acknowledgement 1210 as relay-able acknowledgement 1215.

FIG. 12B illustrates one implementation of a packet format for a relay-able acknowledgement 1230. For example, relay-able acknowledgement packet 1230 may correspond to relay-able acknowledgement 1210 or 1215 illustrated in FIG. 12A. The relay-able acknowledgement 1230 includes frame control 1230$a$ and duration 1230$b$ fields. The receiver address field 1230$c$ will be set to the address of the access point when the STA 306 acknowledges data sent by the access point 304. The transmit address of the frame 1230$d$ will be set to the address of the STA 306. The relay-able acknowledgement frame 1230 also includes a sequence number field 1230$e$. A sequence number stored in the sequence number field corresponds to the sequence number included in the data packet (for example, data packet 1205) being acknowledged by the relay-able acknowledgement. The relay-able acknowledgement also includes a frame check sequence field 1230$f$.

Figure 13A:
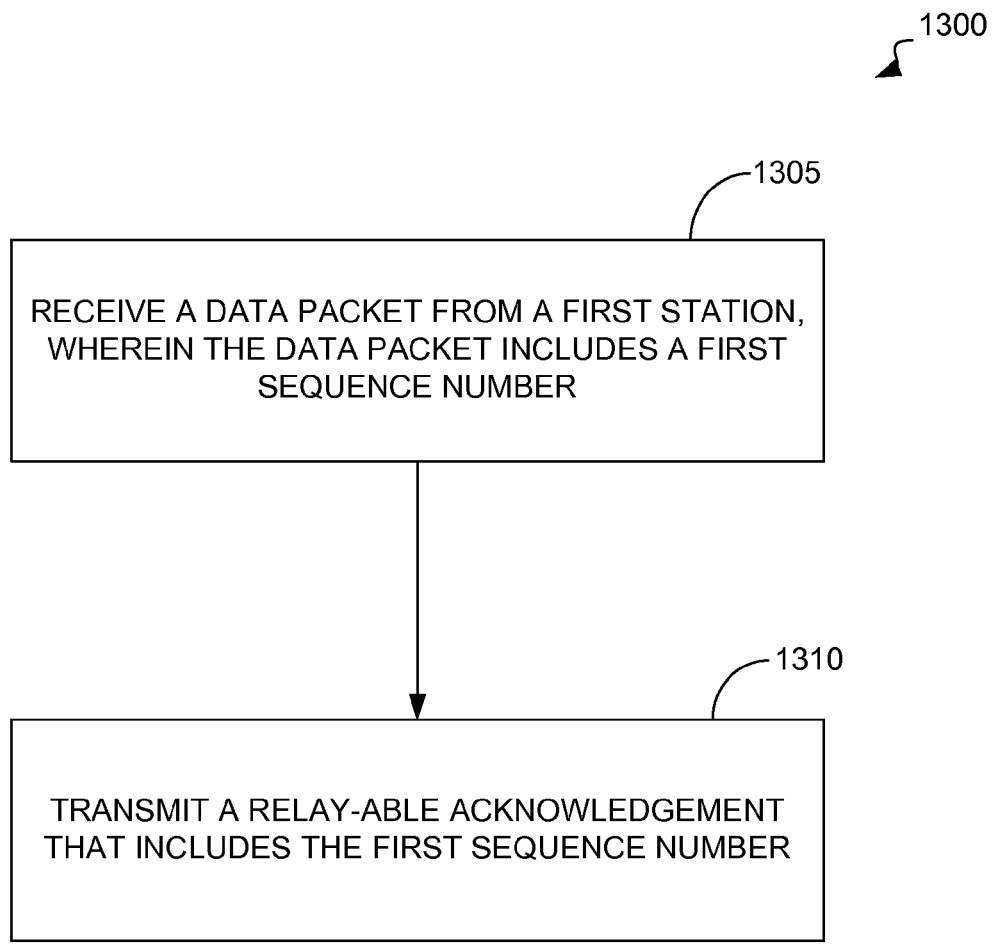
FIG. 13A is a flowchart of a process for acknowledging data sent by from a first station to a second station in the wireless communications system of FIGS. 1 and 3.

FIG. 13A is a flowchart of a process for acknowledging data sent by a first station and received by a second station in the wireless communications system of FIGS. 1 and 3. In some aspects, process 1300 is a method of relaying data in an 802.11 wireless communications network between a station and an access point using a relay. In an embodiment, process 1300 may be performed by a station, such as STA 306 illustrated in FIG. 3. In processing block 1305, a data packet is received from the first station. Note that in some aspects, the first station may be operating as an AP as discussed above. The data packet includes a first sequence number. In an embodiment, processing block 1305 may be implemented by the receiver 212. In processing block 1310, the data received in processing block 1305 is acknowledged by transmitting a relay-able acknowledgement that includes the first sequence number. In an embodiment, the relay-able acknowledgement may also include a transmitter's address. In an embodiment, processing block 1310 may be implemented by the transmitter 210.

Figure 13B:
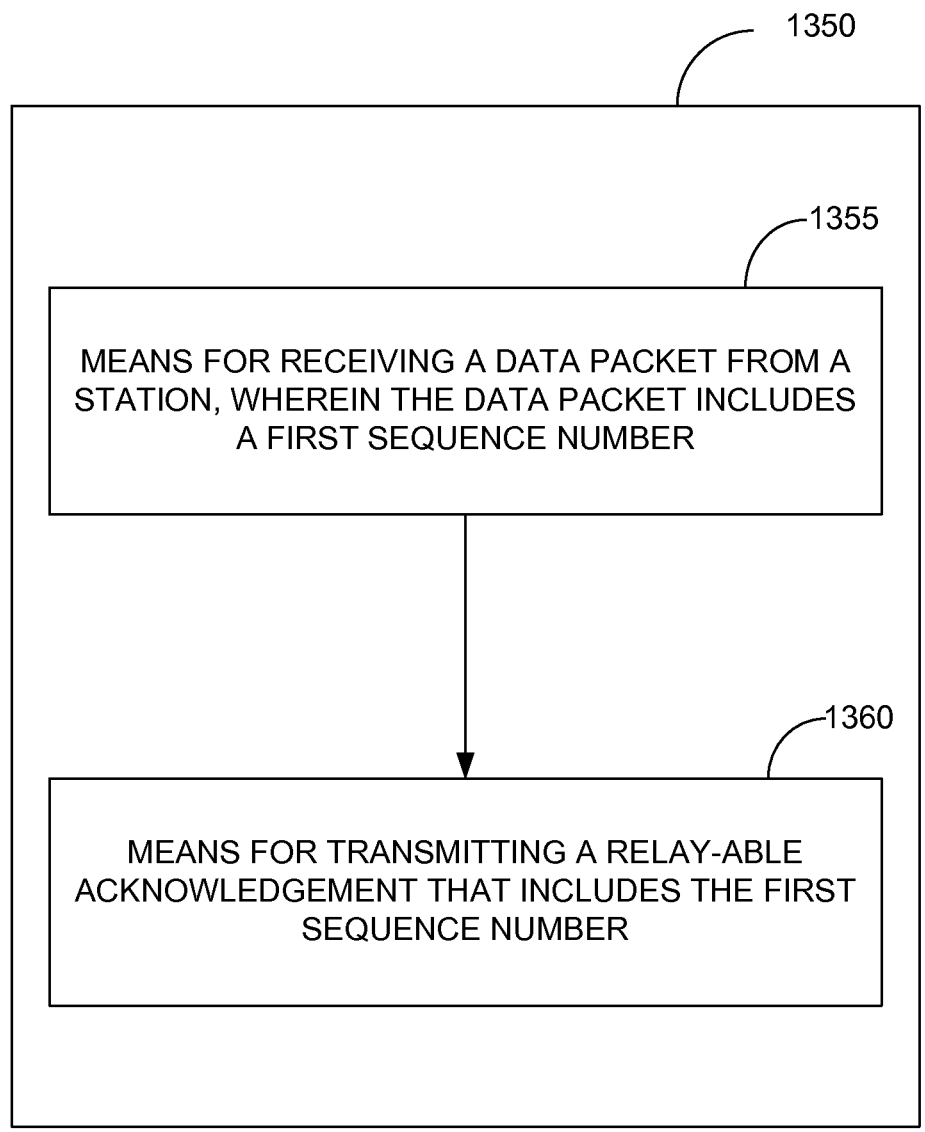
FIG. 13B is a functional block diagram of an exemplary device 1350 that may be employed within the wireless communication system 100 or 300

FIG. 13B is a functional block diagram of an exemplary device 1350 that may be employed within the wireless communication system 100 or 300. The device 1350 includes means 1355 for receiving a data packet from a station, wherein the data packet includes a first sequence number. In an embodiment, means 1355 may be configured to perform one or more of the functions discussed above with respect to block 1305. The means 1355 for receiving a data packet from a station, wherein the data packet includes a first sequence number may include a receiver, such as receiver 212 of FIG. 2. Means 1355 may also include one or more of a processor, signal generator, transceiver, decoder, or a combination of hardware and/or software component(s), circuits, and/or module(s). The device 1350 further includes means 1360 for transmitting a relay-able acknowledgement that includes the first sequence number. In an embodiment, means 1360 may be configured to perform one or more of the functions discussed above with respect to block 1310. In an embodiment, the means for transmitting a relay-able acknowledgement that includes the first sequence number 1360 may include a transmitter, such as transmitter 210 of FIG. 2. Means 1360 may also include one or more of a processor, signal generator, transceiver, decoder, or a combination of hardware and/or software component(s), circuits, and/or module(s)

Figure 14A:
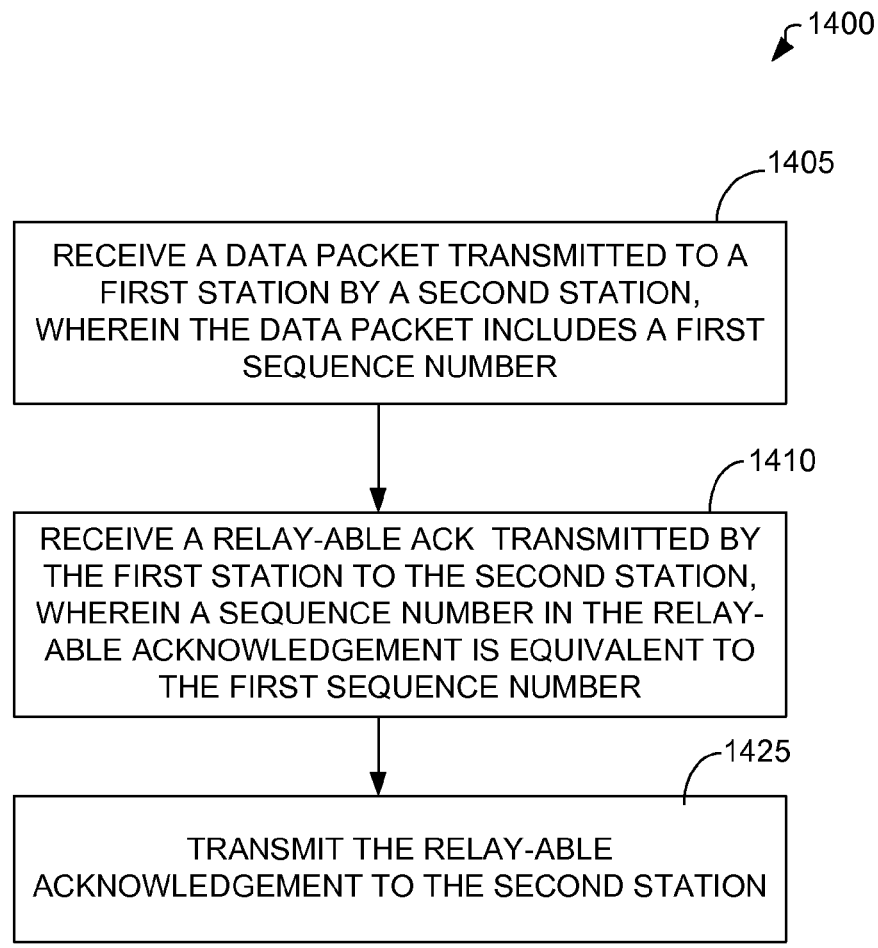
FIG. 14A is a flowchart of a process for retransmitting a relay-able acknowledgement in the wireless communications system of FIGS. 1 and 3.

FIG. 14A is a flowchart of a process for retransmitting a relay-able acknowledgement in the wireless communications system of FIGS. 1 and 3. In some aspects, process 1400 is a method of relaying data in an 802.11 wireless communications network between a station and an access point using a relay. In an embodiment, process 1400 may be performed by a store and forward relay, such as relay 320 illustrated in FIG. 3. In processing block 1405, a data packet transmitted to a first station by a second station is received. The data packet includes a first sequence number. In an embodiment, processing block 1405 may be implemented by the transmitter 210. In processing block 1410, a relay-able acknowledgment transmitted by the first station to the second station is received. A sequence number in the R-ACK is equivalent to the first sequence number. The R-ACK may also include a transmitter's address. For example, the R-ACK may include the address of the STA. In an embodiment, processing block 1405 may be implemented by the receiver 212. In processing block 1425, the relay-able acknowledgement is transmitted to the access point. In an embodiment, the relay may wait a Short Inter-Frame Space (SIFS) time period before transmitting the relay-able acknowledgment. In an embodiment, processing block 1425 may be implemented by the transmitter 210. In an embodiment, if transmissions by the access point are detected by the relay during the SIFS time period, the relay-able acknowledgement may not be transmitted in block 1425.

Figure 14B:
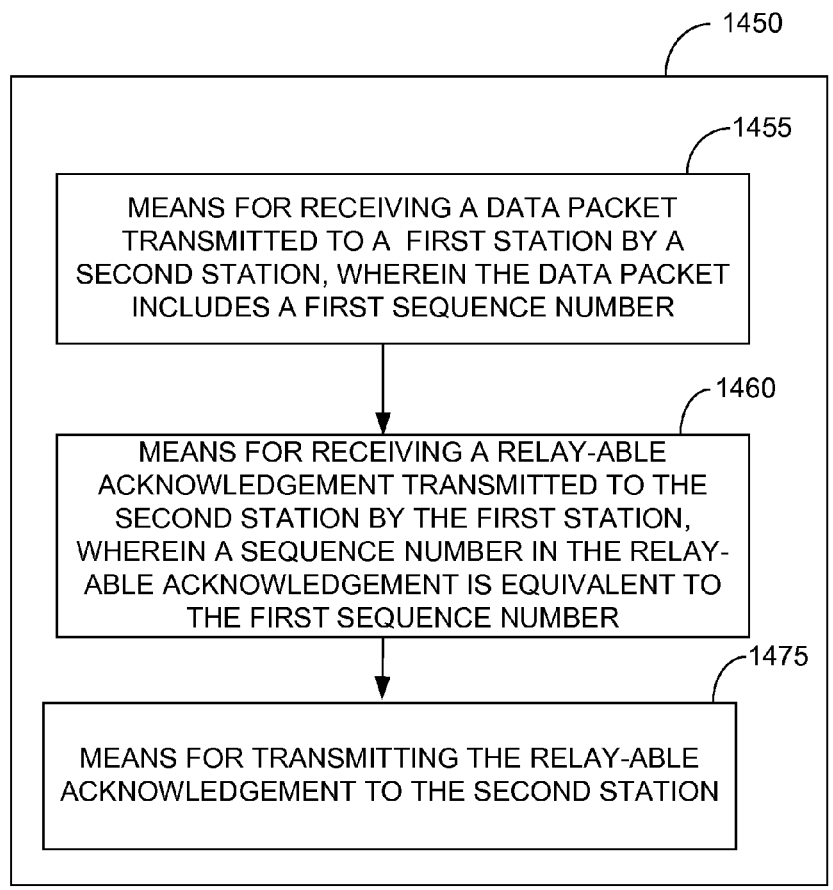
FIG. 14B is a functional block diagram of an exemplary device 1450 that may be employed within the wireless communication system 100 or 300.

FIG. 14B is a functional block diagram of an exemplary device 1450 that may be employed within the wireless communication system 100 or 300. The device 1450 includes means 1455 for receiving a data packet transmitted to a first station by a second station. The data packet includes a first sequence number. In an embodiment, means 1455 may be configured to perform one or more of the functions discussed above with respect to block 1405. The device 1450 further includes means 1460 for receiving a relay-able acknowledgement (R-ACK) transmitted to the second station by the first station. A sequence number in the R-ACK is equivalent to the first sequence number. In an embodiment, means 1460 may be configured to perform one or more of the functions discussed above with respect to block 1410. The means 1460 for receiving a relay-able acknowledgement (R-ACK) transmitted to the second station by the first station may include a receiver, such as receiver 212 of FIG. 2. Means 1460 may also include one or more of a processor, signal generator, transceiver, decoder, or a combination of hardware and/or software component(s), circuits, and/or module(s). The device 1475 further includes means 1475 for transmitting the R-ACK to the second station. In an embodiment, means 1475 may be configured to perform one or more of the functions discussed above with respect to block 1425. In an embodiment, the means for transmitting the R-ACK to the second station 1475 may include a transmitter, such as transmitter 210 of FIG. 2. Means 1475 may also include one or more of a processor, signal generator, transceiver, decoder, or a combination of hardware and/or software component(s), circuits, and/or module(s).

Figure 15A:
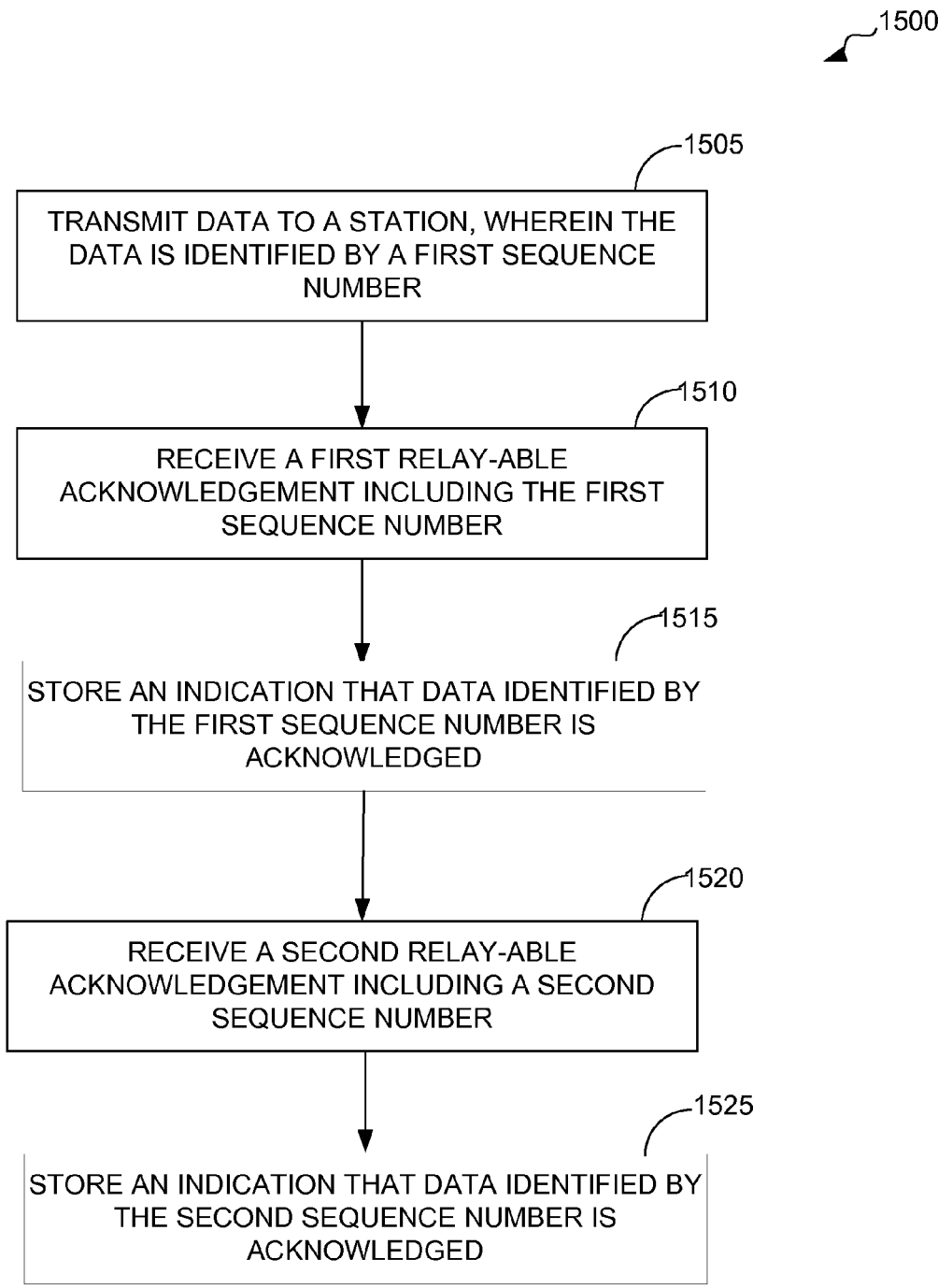
FIG. 15A is a flowchart of a process for transmitting data in the wireless communications system of FIGS. 1 and 3.

FIG. 15A is a flowchart of a process for transmitting data in the wireless communications system of FIGS. 1 and 3. In some aspects, process 1500 is a method of relaying data in an 802.11 wireless communications network between a station and an access point using a relay. In one aspect, process 1500 is performed by a relay. In processing block 1505, data is transmitted to a station. The data is identified with a first sequence number. For example, in some implementations, the data sent to the station (SDA) may be sent in a data packet. The data packet may be composed of several fields, for example, a receiver address field, a transmitter address field, and a sequence number field. In an embodiment, the first sequence number may be encoded in a field of the data packet. In an embodiment, processing block 1505 may be implemented by the transmitter 210. In processing block 1510, a first relay-able acknowledgement (R-ACK) is received. The first R-ACK includes the first sequence number. The R-ACK may also include a transmitter's address. In some implementations, this first relay-able acknowledgement may have been sent or transmitted by the SDA. The first relay-able acknowledgement may also have been sent or transmitted by a relay. In an embodiment, processing block 1510 may be implemented by the receiver 212. In processing block 1515, an indication that data identified by the first sequence number has been acknowledged is stored. In an embodiment, processing block 1515 may be implemented by the processor 204. In processing block 1520, a second R-ACK is received with a second sequence number. The second R-ACK may also include a transmitter's address. The second sequence number may be equivalent to the first sequence number. In an embodiment, processing block 1520 may be implemented by the receiver 212. In processing block 1525, an indication that data identified by the second sequence number has been acknowledged is stored. If the first sequence number and second sequence number received in the illustrated process 1500 are equivalent, the same data may be marked as acknowledged twice in some implementations. When receiving a relay-able acknowledgement message, some other implementations may first determine whether data corresponding to a sequence number included in the relay-able acknowledgement message has previously been acknowledged. If data identified by the R-ACK sequence number has already been acknowledged, these implementations may simply drop the relay-able acknowledgement message without further processing. In an embodiment, processing block 1525 may be implemented by the processor 204.

In some networking environments, processing blocks 1520 and 1525 may not be performed for all transmitted data packets. For example, in some networking environments, an access point and a station may not be able to communicate properly with each other. The access point may be out of the transmit range of the station, such that the access point and the station cannot communicate directly with each other. In these environments, the relay-able acknowledgement may be sent by the station, but not received by an access point running process 1500. In these environments, a relay may retransmit the relay-able acknowledgement on behalf of the station. Because the relay may have a stronger transmit power than the station, or because the relay may be positioned more closely to the access point than the station, the relay's retransmission of the acknowledgement may be received by the access point. In these network environments, only one relay-able acknowledgement may be received by an access point running process 1500. This may be the case even if two relay-able acknowledgements are sent. For example, one R-ACK may be sent by a station and one R-ACK may be sent by a relay. Yet, only one R-ACK may be received by an access point running process 1500.

Figure 15B:
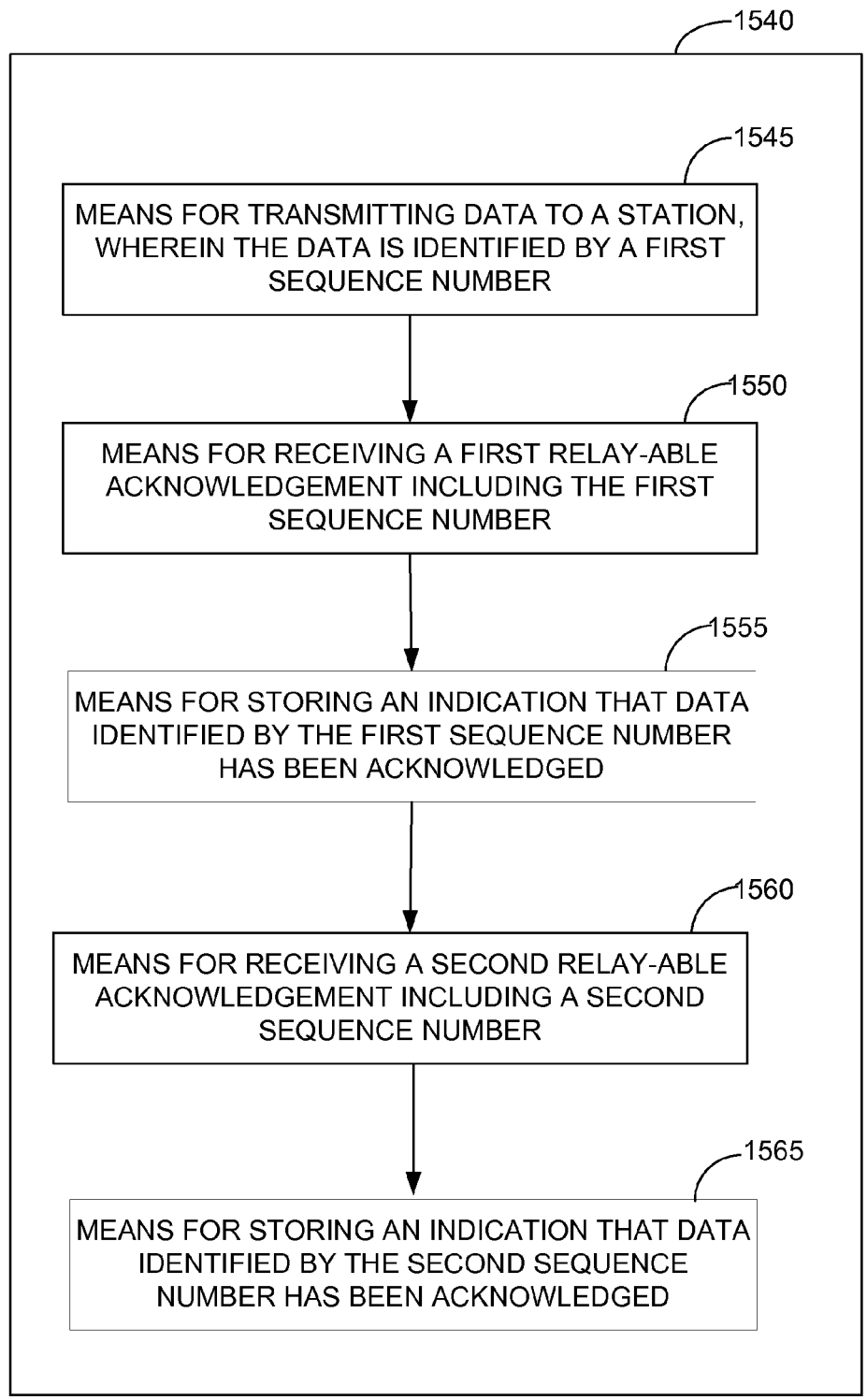
FIG. 15B is a functional block diagram of an exemplary device 1540 that may be employed within the wireless communication system 100 or 300.

FIG. 15B is a functional block diagram of an exemplary device 1540 that may be employed within the wireless communication system 100 or 300. The device 1540 includes means 1545 for transmitting data to a station, wherein the data is identified by a first sequence number. In an embodiment, means 1545 may be configured to perform one or more of the functions discussed above with respect to block 1505. In an embodiment, the means for transmitting data to a station, wherein the data is identified by a first sequence number 1545 may include a transmitter, such as transmitter 210 of FIG. 2. Means 1545 may also include one or more of a processor, signal generator, transceiver, decoder, or a combination of hardware and/or software component(s), circuits, and/or module(s). The device 1540 further includes means 1550 for receiving a first relay-able acknowledgement (R-ACK) including the first sequence number. In an embodiment, means 1550 may be configured to perform one or more of the functions discussed above with respect to block 1510. The means 1550 for receiving a first relay-able acknowledgement (R-ACK) including the first sequence number may include a receiver, such as receiver 212 of FIG. 2. Means 1550 may also include one or more of a processor, signal generator, transceiver, decoder, or a combination of hardware and/or software component(s), circuits, and/or module(s). The device 1540 further includes means 1555 for storing an indication that data identified by the first sequence number has been acknowledged. In an embodiment, means 1555 may be configured to perform one or more of the functions discussed above with respect to block 1515. The device 1540 further includes means 1560 for receiving a second relay-able acknowledgement (R-ACK) including a second sequence number. In an embodiment, means 1560 may be configured to perform one or more of the functions discussed above with respect to block 1520. The means 1560 for receiving a second relay-able acknowledgement (R-ACK) including a second sequence number may include a receiver, such as receiver 212 of FIG. 2. Means 1560 may also include one or more of a processor, signal generator, transceiver, decoder, or a combination of hardware and/or software component(s), circuits, and/or module(s). The device 1540 further includes means 1565 for storing an indication that data identified by the second sequence number has been acknowledged. In an embodiment, means 1565 may be configured to perform one or more of the functions discussed above with respect to block 1525.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in an 802.11 wireless communications network between a first station and a second station using a relay, comprising:
   transmitting, by the first station, a request-to-send message to the relay;
   receiving, by the first station, a clear-to-send message from the relay;
   transmitting, by the first station, data identified by a first sequence number to the second station via a communication path that is independent of the relay based, at least in part, on receiving the clear-to-send message from the relay, and
   receiving, by the first station, a first relay-able acknowledgement message, wherein the first relay-able acknowledgement message includes the first sequence number, wherein the first relay-able acknowledgement message is received from the second station via the communication path that is independent of the relay if the first station transmits on the 802.11 wireless communications network within a time period after the second station transmits the first relay-able acknowledgement message, and wherein the first relay-able acknowledgement message is received from the relay if the first station does not transmit on the 802.11 wireless communications network within the time period.

2. The method of claim 1, wherein the first relay-able acknowledgement message includes a transmitter's address.

3. The method of claim 1, further comprising receiving, by the first station, a second relay-able acknowledgment message including the first sequence number.

4. The method of claim 3, wherein the first relay-able acknowledgement message is transmitted by the second station and the second relay-able acknowledgement message is transmitted by the relay.

5. The method of claim 1, wherein the first station is an access point.

6. The method of claim 1, further comprising:
   transmitting, by the first station, a probe request message; and
   receiving, by the first station, a probe response message from the relay, the probe response identifying the second station.

7. The method of claim 6, wherein the probe response message also identifies capabilities of the relay.

8. The method of claim 6, further comprising:
   transmitting, by the first station, a relay request message to the relay, the relay request message requesting that the relay provide relay services for packets transmitted by the first station; and
   receiving, by the first station, a relay response message from the relay.

9. The method of claim 8, further comprising transmitting, by the first station, a relay confirm message to the relay in response to the reception of the relay response from the relay.

10. A first station for communicating in an 802.11 wireless communications network between the first station and a second station using a relay, comprising:
    a transmitter configured to transmit a request-to-send to the relay;
    a receiver configured to receive a clear-to-send from the relay;
    wherein the transmitter is further configured to transmit data identified by a first sequence number to the second station via a communication path that is independent of the relay based, at least in part, on receiving the clear-to-send message from the relay; and
    wherein the receiver is further configured to receive a first relay-able acknowledgement message, wherein the first relay-able acknowledgement message includes the first sequence number, wherein the first relay-able acknowledgement message is received from the second station via the communication path that is independent of the relay if the first station transmits on the 802.11 wireless communications network within a time period after the second station transmits the first relay-able acknowledgement message, and wherein the first relay-able acknowledgement message is received from the relay if the first station does not transmit on the 802.11 wireless communications network within the time period.

11. The first station of claim 10, wherein the first relay-able acknowledgement message includes a transmitter's address.

12. The first station of claim 10, wherein the receiver is further configured to receive a second relay-able acknowledgment message including the first sequence number.

13. The first station of claim 12, wherein the first relay-able acknowledgement message is transmitted by the second station and the second relay-able acknowledgement message is transmitted by the relay.

14. The first station of claim 10, wherein the first station is an access point.

15. The first station of claim 10, wherein the transmitter is further configured to transmit a probe request message, and the receiver is further configured to receive a probe response message from the relay, the probe response identifying the second station.

16. The first station of claim 15, wherein the probe response message also identifies capabilities of the relay.

17. The first station of claim 15, wherein the transmitter is further configured to transmit a relay request message to the relay, the relay request message requesting that the relay provide relay services for packets transmitted by the first station, and the receiver is further configured to receive a relay response message from the relay.

18. The first station of claim 17, wherein the transmitter is further configured to transmit a relay confirm message to the relay in response to the reception of the relay response from the relay.

19. A first station for communicating in an 802.11 wireless communications network between the first station and a second station using a relay, comprising:
means for transmitting a request-to-send to the relay;
means for receiving a clear-to-send from the relay;
means for transmitting data identified by a first sequence number to the second station via a communication path that is independent of the relay based, at least in part, on receiving the clear-to-send from the relay; and
means for receiving a relay-able acknowledgement message, wherein the relay-able acknowledgement message includes the first sequence number, wherein the relay-able acknowledgement message includes a transmitter's address, wherein the first relay-able acknowledgement message is received from the second station via the communication path that is independent of the relay if the first station transmits on the 802.11 wireless communications network within a time period after the second station transmits the first relay-able acknowledgement message, and wherein the first relay-able acknowledgement message is received from the relay if the first station does not transmit on the 802.11 wireless communications network within the time period.

20. The first station of claim 19, further comprising means for receiving a second relay-able acknowledgment message including the first sequence number.

21. The first station of claim 20, wherein the second relay-able acknowledgment message includes a transmitter's address.

22. The first station of claim 20, wherein the first relay-able acknowledgement message is transmitted by the second station and the second relay-able acknowledgement message is transmitted by the relay.

23. The first station of claim 19, wherein the first station is an access point.

24. The first station of claim 19, further comprising:
means for transmitting a probe request message; and
means for receiving a probe response message from the relay, the probe response identifying the second station.

25. The method of claim 24, wherein the probe response message also identifies capabilities of the relay.

26. The method of claim 24, further comprising:
means for transmitting a relay request message to the relay, the relay request message requesting that the relay provide relay services for packets transmitted by the first station; and
means for receiving, by the first station, a relay response message from the relay.

27. The method of claim 26, further comprising means for transmitting a relay confirm message to the relay in response to the reception of the relay response from the relay.

28. A non-transitory computer readable medium comprising instructions that when executed cause a first station to perform a method of communicating in an 802.11 wireless communications network between the first station and a second station using a relay, the method comprising:
transmitting a request-to-send message to the relay;
receiving a clear-to-send message from the relay;
transmitting, by the first station, data identified by a first sequence number to the second station via a communication path that is independent of the relay based, at least in part, on receiving the clear-to-send message from the relay; and
receiving, by the first station, a relay-able acknowledgement message, wherein the relay-able acknowledgement message includes the first sequence number, wherein the first relay-able acknowledgement message is received from the second station via the communication path that is independent of the relay if the first station transmits on the 802.11 wireless communications network within a time period after the second station transmits the first relay-able acknowledgement message, and wherein the first relay-able acknowledgement message is received from the relay if the first station does not transmit on the 802.11 wireless communications network within the time period.

29. The computer readable medium of claim 28, wherein the first relay-able acknowledgement message includes a transmitter's address.

30. The computer readable medium of claim 28, further comprising instructions that when executed cause the first station to receive a second relay-able acknowledgment message including the first sequence number.

31. The computer readable medium of claim 30, wherein the second relay-able acknowledgement message includes a transmitter's address.

32. The computer readable medium of claim 30, wherein the first relay-able acknowledgement message is transmitted by the second station and the second relay-able acknowledgement message is transmitted by the relay.

33. The computer readable medium of claim 28, wherein the first station is an access point.

34. The computer readable storage medium of claim 28, the method further comprising:
transmitting, by the first station, a probe request message; and
receiving, by the first station, a probe response message from the relay, the probe response identifying the second station.

35. The computer readable storage medium of claim 34, wherein the probe response message also identifies capabilities of the relay.

36. The computer readable storage medium of claim 34, the method further comprising:
transmitting, by the first station, a relay request message to the relay, the relay request message requesting that the relay provide relay services for packets transmitted by the first station; and receiving, by the first station, a relay response message from the relay.

37. The computer readable storage medium of claim 36, the method further comprising transmitting, by the first station, a relay confirm message to the relay in response to the reception of the relay response from the relay.

38. A method of communicating in an 802.11 wireless communications network between a first station and a second station using a relay, comprising:
   transmitting, by the first station, a request-to-send message to the relay;
   receiving, by the first station, a clear-to-send message from the relay; and
   transmitting, by the first station, data to the second station based at least in part, on the clear-to-send message received from the relay, wherein the data is communicated to the second station via a communication path that is independent of the relay if the second station acknowledges the data within a time period after the first station transmits the data, and wherein the data is communicated to the second station via the relay if the second station does not acknowledge the data within the time period.

39. The method of claim 38, wherein the request-to-send message specifies the relay's address in a receiver address field.

40. The method of claim 38, further comprising receiving, via the relay, an acknowledgement message for the data from the second station.

41. The method of claim 38, wherein the second station receives the clear-to-send message sent by the relay.

42. The method of claim 38, wherein the first station transmits the data to the second station, and the relay retransmits the data to the second station.

43. The method of claim 38, wherein the second station is an access point.

44. A first station for communicating in an 802.11 wireless communications network between the first station and a second station using a relay, comprising:
   a transmitter configured to transmit a request-to-send message to the relay; and
   a receiver configured to receive a clear-to-send message from the relay,
   wherein the transmitter is further configured to transmit data to the second station based at least in part, on the clear-to-send received from the relay, wherein the data is communicated to the second station via a communication path that is independent of the relay if the second station acknowledges the data within a time period after the first station transmits the data, and wherein the data is communicated to the second station via the relay if the second station does not acknowledge the data within the time period.

45. The first station of claim 44, wherein the request-to-send message specifies the relay's address in a receiver address field.

46. The first station of claim 44, wherein the receiver is further configured to receive, via the relay, an acknowledgement message for the data from the second station.

47. The first station of claim 44, wherein the first station receives the clear-to-send message sent by the relay.

48. A first station for communicating in an 802.11 wireless communications network between the first station and a second station using a relay, comprising:
   means for transmitting a request-to-send message to the relay;
   means for receiving a clear-to-send message from the relay; and
   means for transmitting data to the second station based at least in part, on the clear-to-send message received from the relay, wherein the data is communicated to the second station via a communication path that is independent of the relay if the second station acknowledges the data within a time period after the first station transmits the data, and wherein the data is communicated to the second station via the relay if the second station does not acknowledge the data within the time period.

49. The first station of claim 48, wherein the request-to-send message specifies the relay's address in a receiver address field.

50. The first station of claim 48, further comprising means for receiving, via the relay, an acknowledgement message for the data from the second station.

51. The first station of claim 48, wherein the first station receives the clear-to-send message sent by the relay.

52. A non-transitory computer readable medium comprising instructions that when executed cause a first station to perform a method of communicating in an 802.11 wireless communications network between the first station and a second station using a relay, the method comprising:
   transmitting a request-to-send message to a relay;
   receiving a clear-to-send message from the relay; and
   transmitting data to the second station based at least in part, on the clear-to-send message received from the relay, and specify a receiver address for the data that does not identify the relay, wherein the data is communicated to the second station via a communication path that is independent of the relay if the second station acknowledges the data within a time period after the first station transmits the data, and wherein the data is communicated to the second station via the relay if the second station does not acknowledge the data within the time period.

53. The non-transitory computer readable medium of claim 52, wherein the request-to-send message specifies the relay's address in a receiver address field.

54. The non-transitory computer readable medium of claim 52, the method further comprising receiving, via the communication path that is independent of the relay, an acknowledgement message for the data from the second station, wherein the acknowledgment message includes a transmitter address that does not identify the relay.

55. The non-transitory computer readable medium of claim 52, wherein the first station receives the clear-to-send message sent by the relay.

* * * * *